United States Patent
Zhang et al.

(10) Patent No.: US 10,461,911 B2
(45) Date of Patent: Oct. 29, 2019

(54) CHANNEL QUALITY INDICATOR FEEDBACK METHOD, USER EQUIPMENT, AND NETWORK DEVICE

(71) Applicant: Huawei Technologies Co., Ltd., Shenzhen, Guangdong (CN)

(72) Inventors: Peng Zhang, Shanghai (CN); Yueying Zhao, Shanghai (CN); Zongjie Wang, Shanghai (CN); Xiaolei Tie, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/011,422

(22) Filed: Jun. 18, 2018

(65) Prior Publication Data
US 2018/0302207 A1    Oct. 18, 2018

Related U.S. Application Data

(63) Continuation of application No. PCT/CN2015/097834, filed on Dec. 18, 2015.

(51) Int. Cl.
*H04L 5/00* (2006.01)
*H04B 10/07* (2013.01)
(Continued)

(52) U.S. Cl.
CPC ......... *H04L 5/0057* (2013.01); *H04B 7/0632* (2013.01); *H04B 10/07* (2013.01);
(Continued)

(58) Field of Classification Search
CPC ..... H04W 24/00; H04W 24/08; H04W 24/02; H04W 72/082; H04L 5/0057; H04L 5/0048; H04B 10/07; H04B 7/0632; H04J 11/005
See application file for complete search history.

(56) References Cited

U.S. PATENT DOCUMENTS

| | | | |
|---|---|---|---|
| 2006/0199577 A1* | 9/2006 | Ramakrishna | H04B 1/707 455/422.1 |
| 2008/0229177 A1* | 9/2008 | Kotecha | H04L 1/0029 714/776 |

(Continued)

FOREIGN PATENT DOCUMENTS

| | | |
|---|---|---|
| CN | 101753187 A | 6/2010 |
| CN | 103096369 A | 5/2013 |

(Continued)

OTHER PUBLICATIONS

Foreign Communication From A Counterpart Application, Chinese Application No. 201580080195.8, Chinese Office Action dated Jun. 26, 2019, 7 pages.

(Continued)

*Primary Examiner* — Afsar M Qureshi
(74) *Attorney, Agent, or Firm* — Conley Rose, P.C.

(57) ABSTRACT

Embodiments of the present disclosure disclose a channel quality indicator (CQI) feedback method, user equipment, and a network device. The method includes: receiving, by the user equipment, a secondary pilot receive signal of each single sector and that is obtained after a secondary pilot transmit signal of each single sector transmitted by a network device is transmitted by using a radio channel; estimating, by the user equipment, a channel matrix according to the secondary pilot receive signal of each single sector and the pre-known secondary pilot transmit signal of each single sector; estimating, by the user equipment, a CQI of each single sector according to the channel matrix and a first precoding matrix, and estimating a CQI of each joint sector according to the channel matrix and a second precoding matrix; and feeding back, by the user equipment, each CQI to the network device.

15 Claims, 9 Drawing Sheets

(51) Int. Cl.
  *H04W 24/00* (2009.01)
  *H04B 7/06* (2006.01)
  *H04W 24/08* (2009.01)
(52) U.S. Cl.
  CPC ............ *H04W 24/00* (2013.01); *H04W 24/08* (2013.01); *H04L 5/0048* (2013.01)

(56) References Cited

U.S. PATENT DOCUMENTS

| | | | |
|---|---|---|---|
| 2010/0246429 A1* | 9/2010 | Hwang | H04H 20/42 370/252 |
| 2011/0096877 A1* | 4/2011 | Kimura | H04L 1/0026 375/347 |
| 2012/0106470 A1* | 5/2012 | Clerckx | H04W 24/10 370/329 |
| 2013/0083758 A1* | 4/2013 | Kim | H04L 25/00 370/329 |
| 2013/0121431 A1 | 5/2013 | Sun et al. | |
| 2014/0241194 A1 | 8/2014 | Zhou et al. | |
| 2015/0009928 A1* | 1/2015 | Sohn | H04L 1/0026 370/329 |
| 2015/0280860 A1 | 10/2015 | Zhang et al. | |
| 2017/0033856 A1 | 2/2017 | Su et al. | |

FOREIGN PATENT DOCUMENTS

| | | |
|---|---|---|
| CN | 103947132 A | 7/2014 |
| CN | 105007126 A | 10/2015 |
| EP | 2154925 A1 | 2/2010 |
| EP | 2919514 A1 | 9/2015 |
| WO | 2013070587 A1 | 5/2013 |
| WO | 2014089949 A1 | 6/2014 |

OTHER PUBLICATIONS

"3rd Generation Partnership Project; Technical Specification Group Radio Access Network; Physical channels and mapping of transport channels onto physical channels (FDD) (Release 12)"; 3GPP TS 25.211 V12.1.0; Dec. 2014; 67 pages.

"3rd Generation Partnership Project; Technical Specification Group Radio Access Network; Multiplexing and channel coding (FDD) (Release 12)"; 3GPP TS 25.212 V12.1.0; Dec. 2014; 167 pages.

Ericsson, "Common Pilot Design for Four branch MIMO System." R1-120810, 3GPP TSG RAN WG1 Meeting #68, Dresden, Germany, Feb. 6-10, 2012, 11 pages, XP050563346.

* cited by examiner

CHANNEL QUALITY INDICATOR FEEDBACK METHOD, USER EQUIPMENT, AND NETWORK DEVICE

CROSS-REFERENCE TO RELATED APPLICATIONS

This application is a continuation of International Application No. PCT/CN2015/097834, filed on Dec. 18, 2015, the disclosure of which is hereby incorporated by reference in its entirety.

TECHNICAL FIELD

The present disclosure relates to the communications field, and in particular, to a channel quality indicator (CQI) feedback method, user equipment, and a network device.

BACKGROUND

In a conventional wideband code division multiple access (WCDMA) cellular network, one cell covers one sector, and resources of the cell can ensure service quality for a user in the sector. When a quantity of users in the sector increases, the resources of the cell cannot ensure service quality for the users in the sector.

A co-cell technology is used to improve service quality. Specifically, one original sector is split into multiple sectors, and then multiple cells with a same scrambling code separately provide services for these sectors. User equipment UE served by using the co-cell technology needs to notify a network device of service quality of a sector in which the UE is located, so that the network device determines a specific sector providing a service for the UE. The network device configures a secondary common pilot channel (S-CPICH) for each sector, and configures a same primary common pilot channel (P-CPICH) for at least two sectors. In a single transmission (ST) mode, a sector independently provides a service for the UE, or in an omni-directional transmission (OT) mode, at least two sectors jointly provide a service for the UE. In this case, service quality for the UE is indicated by using a CQI. First, the UE may estimate channel quality indicators (CQI) of each single sector and each joint sector by measuring a primary pilot and a secondary pilot, the UE reports the channel quality indicators (CQI) of each single sector and each joint sector to a base station (NodeB), and after receiving the CQIs, the NodeB may determine, according to the received channel quality indicators (CQI) of each single sector and each joint sector, that a single sector or a joint sector provides a service for the UE.

In the prior art, in the ST mode, the user equipment UE can obtain a CQI of only one sector by performing estimation once. Therefore, if there are N sectors, and N is a positive integer, the UE needs to perform estimation N times to obtain CQIs of the N sectors. In the OT mode, the UE obtains a CQI of one joint sector by performing estimation once. This imposes a big challenge on complexity of the UE, and wastes hardware resources of the UE.

SUMMARY

Embodiments of the present disclosure provide a channel quality indicator (CQI) feedback method, user equipment, and a network device, so as to reduce complexity of the user equipment, and save hardware resources of the user equipment.

A first aspect of the embodiments of the present disclosure provides a channel quality indicator feedback method, and the method is applied to a co-cell communications system. A cell in the co-cell communications system includes at least two single sectors and at least one joint sector. That is, if a cell includes two single sectors: a sector 1 and a sector 2, the cell includes one joint sector, and a mode in which the sector 1 and the sector 2 jointly provide a service is referred to as a joint-sector service mode. In an ST mode, each of the at least two single sectors is used to provide a single-sector communications service for user equipment in the cell. In an OT mode, each of the at least one joint sector is used to provide a joint-sector communications service for the user equipment. The method may include:

receiving, by the user equipment, a secondary pilot receive signal that is of each single sector and that is obtained after a secondary pilot transmit signal of each single sector transmitted by a network device is transmitted by using a radio channel; estimating, by the user equipment, a CQI of each single sector according to the secondary pilot receive signal of each single sector, the pre-known secondary pilot transmit signal of each single sector, and a first precoding matrix, and estimating a CQI of each joint sector according to the secondary pilot receive signal of each single sector, the pre-known secondary pilot transmit signal of each single sector, and a second precoding matrix; and feeding back, by the user equipment, each CQI to the network device. It should be noted that this implementation includes: estimating, by the user equipment, a channel matrix according to the secondary pilot receive signal of each single sector and the pre-known secondary pilot transmit signal of each single sector, where the secondary pilot transmit signal of each single sector is pre-known to the user equipment and the network device, and the secondary pilot transmit signal of each single sector is transmitted by the network device by using the radio channel, so that the user equipment receives the secondary pilot receive signal of each single sector; and estimating, by the user equipment, the CQI of each single sector according to the channel matrix and the first precoding matrix, and estimating the CQI of each joint sector according to the channel matrix and the second precoding matrix, where multi-stream transmission and single-stream transmission in a MIMO technology are used to estimate the CQI of each single sector and the CQI of each joint sector.

In an embodiment of the first aspect of the present disclosure, the user equipment is in a co-cell mode. The user equipment first estimates the channel matrix according to the received secondary pilot receive signal of each single sector and the pre-known secondary pilot transmit signal of each single sector, and then estimates the CQI of each single sector according to the channel matrix and the first precoding matrix, so that CQIs of all single sectors are obtained at a time. This improves operating efficiency of the user equipment and saves hardware resources of the UE.

With reference to the first aspect of the embodiments of the present disclosure, in a first possible implementation of the first aspect of the embodiments of the present disclosure, when feeding back each CQI to the network device, the user equipment further feeds back a precoding matrix indicating a sector corresponding to each CQI. The precoding matrix herein is coded by using a precoding rule, and the rule is predefined by the network device and the user equipment.

In an embodiment of the first aspect of the present disclosure, the user equipment further feeds back the precoding matrix indicating a sector corresponding to each CQI. To help the network device learn a sector corresponding to each CQI, the network device may allocate, according to different CQIs, a target sector to provide a communications service for the user equipment.

With reference to the first aspect of the embodiments of the present disclosure, in a second possible implementation of the first aspect of the embodiments of the present disclosure, the user equipment feeds back each CQI by using a period feedback rule. Similarly, the period feedback rule herein is also predefined by the user equipment and the network device. When a feedback period corresponding to each single sector arrives, the user equipment feeds back, to the network device, the CQI corresponding to each single sector; or when a feedback period corresponding to each joint sector arrives, the user equipment feeds back, to the network device, the CQI corresponding to each joint sector.

In an embodiment of the first aspect of the present disclosure, each CQI is fed back in different periods, and the network device learns, by using the period feedback rule, that a CQI received in a corresponding period is a CQI of a sector defined by using the period feedback rule. In this feedback manner, only a CQI is fed back, thereby saving network resources.

With reference to the first aspect of the embodiments of the present disclosure, in a third possible implementation of the first aspect of the embodiments of the present disclosure, the user equipment feeds back a CQI by using a period feedback rule and a predefined joint coding rule. The rules herein are also predefined by the network device and the user equipment. When a single-sector joint feedback period arrives, the user equipment feeds back, to the network device, the CQI that is of each single sector and that is coded according to a predefined joint coding rule; or when a joint-sector joint feedback period arrives, the user equipment feeds back, to the network device, the CQI that is of each joint sector and that is coded according to the predefined joint coding rule. It may be understood that the CQI of each single sector and the CQI of each joint sector are first coded by using the predefined joint coding rule, and then are fed back according to the period feedback rule.

In an embodiment of the first aspect of the present disclosure, the user equipment first codes the CQI of each single sector and the CQI of each joint sector by using the joint coding rule, so that CQIs of multiple CQIs can be fed back at a time. The CQIs are fed back by using the period feedback rule, so that load of the user equipment during feedback can be reduced.

With reference to the first aspect of the embodiments of the present disclosure, in a fourth possible implementation of the first aspect of the embodiments of the present disclosure, the user equipment feeds back a CQI by using a period feedback rule and a precoding rule. The rules herein are also predefined by the network device and the user equipment. When a single-sector joint feedback period arrives, the user equipment feeds back, to the network device, the CQI of each single sector and a precoding matrix indicating a single sector corresponding to the CQI of each single sector; or when a joint-sector joint feedback period arrives, the user equipment feeds back, to the network device, the CQI of each joint sector and a precoding matrix indicating a joint sector corresponding to the CQI of each joint sector. The user equipment further feeds back a precoding matrix when feeding back a CQI by using the period feedback rule, and the precoding matrix is used to indicate a corresponding sector.

In an embodiment of the first aspect of the present disclosure, the user equipment feeds back a CQI by using the period feedback rule, so that load of the user equipment during feedback can be reduced. A precoding matrix is further fed back when each CQI is being fed back, so that the network device can identify a sector corresponding to each CQI. This ensures transmission security.

A second aspect of the embodiments of the present disclosure provides a channel quality indicator receiving method, and the method is applied to a co-cell communications system. A cell in the co-cell communications system includes at least two single sectors and at least one joint sector. That is, if a cell includes two single sectors: a sector 1 and a sector 2, the cell includes one joint sector, and a mode in which the sector 1 and the sector 2 jointly provide a service is referred to as a joint-sector service mode. In an ST mode, each of the at least two single sectors is used to provide a single-sector communications service for user equipment in the cell. In an OT mode, each of the at least one joint sector is used to provide a joint-sector communications service for the user equipment. The method may include:

transmitting, by a network device, a secondary pilot transmit signal of each single sector to the user equipment, where the secondary pilot transmit signal of each single sector is pre-known to the network device and the user equipment, and the secondary pilot transmit signal of each single sector is sent to the user equipment by using the radio channel, so that the user equipment obtains a secondary pilot receive signal; and receiving, by the network device, each CQI fed back by the user equipment, where each CQI is used by the network device to determine a target sector providing a communications service for the user equipment.

In an embodiment of the second aspect of the present disclosure, when receiving each CQI, the network device may determine, according to values of different CQIs, the target sector providing the communications service for the user equipment.

With reference to the second aspect of the embodiments of the present disclosure, in a first possible implementation of the second aspect of the embodiments of the present disclosure, when receiving each CQI fed back by the user equipment, the network device further receives a precoding matrix indicating a sector corresponding to each CQI. The network device may learn, according to a precoding rule, that each precoding matrix indicates a sector corresponding to each CQI, and the network device determines, according to different CQIs, the target sector providing the communications service for the user equipment.

In an embodiment of the second aspect of the present disclosure, the network device learns, according to a precoding matrix, sector information corresponding to each CQI, so that information transmission reliability is ensured. The network device determines, according to different CQIs, the target sector providing the communications service for the user equipment.

With reference to the second aspect of the embodiments of the present disclosure, in a second possible implementation of the second aspect of the embodiments of the present disclosure, the network device receives, according to a period feedback rule defined by the network device and the user equipment, a CQI fed back by the user equipment. When a feedback period corresponding to each single sector arrives, the network device receives a CQI that is corresponding to each single sector and that is fed back by the user equipment; or when a feedback period corresponding to each joint sector arrives, receives a CQI that is corresponding to each joint sector and that is fed back by the user equipment. Each CQI is used by the network device to determine the target sector providing the communications service for the user equipment.

In an embodiment of the second aspect of the present disclosure, the network device receives only a CQI, and learns corresponding sector information according to CQIs fed back in different periods. This is a simpler manner.

With reference to the second aspect of the embodiments of the present disclosure, in a third possible implementation of the second aspect of the embodiments of the present disclosure, the network device receives, according to a period feedback rule and a joint coding rule that are predefined by the network device and the user equipment, a CQI fed back by the user equipment. When a single-sector joint feedback period arrives, the network device receives a CQI that is of each single sector, coded according to a predefined joint coding rule, and fed back by the user equipment; or when a joint-sector joint feedback period arrives, receives a CQI that is of each joint sector, coded according to the predefined joint coding rule, and fed back by the user equipment. Each CQI is used by the network device to determine the target sector providing the communications service for the user equipment.

In an embodiment of the second aspect of the present disclosure, the network device may learn, by using the period feedback rule, that a joint code CQI of each single sector and a jointly coded CQI of each joint sector then may learn, by using the predefined joint coding rule, sector information corresponding to each CQI, and determine, according to different CQIs, the target sector providing the communications service for the user equipment.

With reference to the second aspect of the embodiments of the present disclosure, in a fourth possible implementation of the second aspect of the embodiments of the present disclosure, the network device receives each CQI according to a period feedback rule and a precoding rule that are defined by the network device and the user equipment. When a single-sector joint feedback period arrives, the network device receives a CQI that is of each single sector and that is fed back by the user equipment, and a precoding matrix indicating a single sector corresponding to the CQI of each single sector; or when a joint-sector joint feedback period arrives, receives a CQI that is of each joint sector and that is fed back by the user equipment, and a precoding matrix indicating a joint sector corresponding to the CQI of each joint sector. Each CQI is used by the network device to determine the target sector providing the communications service for the user equipment.

In an embodiment of the second aspect of the present disclosure, the network device learns, according to a precoding matrix, sector information corresponding to each CQI, so that information transmission security is ensured. The network device determines, according to different CQIs, the target sector providing the communications service for the user equipment.

A third aspect of the present disclosure provides user equipment, and the user equipment is applied to a co-cell communications system. A cell in the co-cell communications system includes at least two single sectors and at least one joint sector. That is, if a cell includes two single sectors: a sector 1 and a sector 2, the cell includes one joint sector, and a mode in which the sector 1 and the sector 2 jointly provide a service is referred to as a joint-sector service mode. In an ST mode, each of the at least two single sectors is used to provide a single-sector communications service for user equipment in the cell. In an OT mode, each of the at least one joint sector is used to provide a joint-sector communications service for the user equipment. The user equipment includes:

a receiving module, configured to receive a secondary pilot receive signal that is of each single sector and that is obtained after a secondary pilot transmit signal of each single sector transmitted by a network device is transmitted by using a radio channel;

an estimation module, configured to: estimate a CQI of each single sector according to the secondary pilot receive signal that is of each single sector and that is received by the receiving module, the pre-known secondary pilot transmit signal of each single sector, and a first precoding matrix, and estimate a CQI of each joint sector according to the secondary pilot receive signal that is of each single sector and that is received by the receiving module, the pre-known secondary pilot transmit signal of each single sector, and a second precoding matrix; and a feedback module, configured to feedback, to the network device, each CQI estimated by the estimation module.

With reference to the third aspect of the embodiments of the present disclosure, in a first possible implementation of the third aspect of the embodiments of the present disclosure, the feedback module is further configured to feedback, to the network device, a precoding matrix indicating a sector corresponding to each CQI.

With reference to the third aspect of the embodiments of the present disclosure, in a second possible implementation of the third aspect of the embodiments of the present disclosure, the feedback module is configured to: when a feedback period corresponding to each single sector arrives, feedback, to the network device, the CQI corresponding to each single sector; or when a feedback period corresponding to each joint sector arrives, feedback, to the network device, the CQI corresponding to each joint sector.

With reference to the third aspect of the embodiments of the present disclosure, in a third possible implementation of the third aspect of the embodiments of the present disclosure, the feedback module is configured to: when a single-sector joint feedback period arrives, feedback, to the network device, the CQI that is of each single sector and that is coded according to a predefined joint coding rule; or when a joint-sector joint feedback period arrives, feed back, to the network device, the CQI that is of each joint sector and that is coded according to the predefined joint coding rule.

With reference to the third aspect of the embodiments of the present disclosure, in a fourth possible implementation of the third aspect of the embodiments of the present disclosure, the feedback module is configured to: when a single-sector joint feedback period arrives, feedback, to the network device, the CQI of each single sector and a precoding matrix indicating a single sector corresponding to the CQI of each single sector; or when a joint-sector joint feedback period arrives, feedback, to the network device, the CQI of each joint sector and a precoding matrix indicating a joint sector corresponding to the CQI of each joint sector.

In an embodiment of the third aspect of the present disclosure, the user equipment can obtain CQIs of multiple single sectors by performing estimation once, and can obtain CQIs of multiple joint sectors by performing estimation once, so that complexity of the user equipment is reduced, and hardware resources of the user equipment are saved. In addition, the user equipment may feedback each CQI to the network device by using different rules.

A fourth aspect of the present disclosure provides a network device, and the network device is applied to a co-cell communications system. A cell in the co-cell communications system includes at least two single sectors and at least one joint sector. That is, if a cell includes two single sectors: a sector 1 and a sector 2, the cell includes one joint sector, and a mode in which the sector 1 and the sector 2 jointly provide a service is referred to as a joint-sector service mode. In an ST mode, each of the at least two single sectors is used to provide a single-sector communications service for user equipment in the cell. In an OT mode, each of the at least one joint sector is used to provide a joint-sector communications service for the user equipment. The network device includes:

a transmitting module, configured to transmit a secondary pilot transmit signal of each single sector to the user equipment; and a receiving module, configured to receive each CQI fed back by the user equipment, where each CQI is used by the network device to determine a target sector providing a communications service for the user equipment.

With reference to the fourth aspect of the embodiments of the present disclosure, in a first possible implementation of the fourth aspect of the embodiments of the present disclosure, the receiving module is further configured to receive a precoding matrix that is fed back by the user equipment and that indicates a sector corresponding to each CQI.

With reference to the fourth aspect of the embodiments of the present disclosure, in a second possible implementation of the fourth aspect of the embodiments of the present disclosure, the receiving module is configured to: when a feedback period corresponding to each single sector arrives, receive a CQI that is corresponding to each single sector and that is fed back by the user equipment; or when a feedback period corresponding to each joint sector arrives, receive a CQI that is corresponding to each joint sector and that is fed back by the user equipment.

With reference to the fourth aspect of the embodiments of the present disclosure, in a third possible implementation of the fourth aspect of the embodiments of the present disclosure, the receiving module is configured to: when a single-sector joint feedback period arrives, receive a CQI that is of each single sector, coded according to a predefined joint coding rule, and fed back by the user equipment; or when a joint-sector joint feedback period arrives, receive a CQI that is of each joint sector, coded according to the predefined joint coding rule, and fed back by the user equipment.

With reference to the fourth aspect of the embodiments of the present disclosure, in a fourth possible implementation of the fourth aspect of the embodiments of the present disclosure, the receiving module is configured to: when a single-sector joint feedback period arrives, receive a CQI that is of each single sector and that is fed back by the user equipment, and a precoding matrix indicating a single sector corresponding to the CQI of each single sector; or when a joint-sector joint feedback period arrives, receive a CQI that is of each joint sector and that is fed back by the user equipment, and a precoding matrix indicating a joint sector corresponding to the CQI of each joint sector.

In an embodiment of the fourth aspect of the present disclosure, the network device receives, by using different rules, each CQI fed back by the user equipment, and determines, according to each obtained CQI, the target sector providing the communications service for the user equipment.

A fifth aspect of the present disclosure provides user equipment, and the user equipment is applied to a co-cell communications system. A cell in the co-cell communications system includes at least two single sectors and at least one joint sector: That is, if a cell includes two single sectors: a sector 1 and a sector 2, the cell includes one joint sector, and a mode in which the sector 1 and the sector 2 jointly provide a service is referred to as a joint-sector service mode. In an ST mode, each of the at least two single sectors is used to provide a single-sector communications service for user equipment in the cell. In an OT mode, each of the at least one joint sector is used to provide a joint-sector communications service for the user equipment. The user equipment includes a radio frequency module, an antenna, a processor, a bus, and a memory. The radio frequency module is connected to the antenna, and the radio frequency module, the processor, and the memory are connected by using the bus. The radio frequency module receives a secondary pilot receive signal of each single sector by using the antenna.

The radio frequency module executes the following function:

receiving a secondary pilot receive signal that is of each single sector and that is obtained after a secondary pilot transmit signal of each single sector transmitted by a network device is transmitted by using a radio channel.

The processor executes the following functions:

estimating a CQI of each single sector according to the secondary pilot receive signal of each single sector, the pre-known secondary pilot transmit signal of each single sector, and a first precoding matrix, and estimating a CQI of each joint sector according to the secondary pilot receive signal of each single sector, the pre-known secondary pilot transmit signal of each single sector, and a second precoding matrix; and feeding back each CQI to the network device.

With reference to the fifth aspect of the embodiments of the present disclosure, in a first possible implementation of the fifth aspect of the embodiments of the present disclosure, the processor is further configured to execute the following function:

feeding back, to the network device, a precoding matrix indicating a sector corresponding to each CQI.

With reference to the fifth aspect of the embodiments of the present disclosure, in a second possible implementation of the fifth aspect of the embodiments of the present disclosure, the processor is configured to execute the following functions:

when a feedback period corresponding to each single sector arrives, feeding back, to the network device, the CQI corresponding to each single sector; or when a feedback period corresponding to each joint sector arrives, feeding back, to the network device, the CQI corresponding to each joint sector.

With reference to the fifth aspect of the embodiments of the present disclosure, in a third possible implementation of the fifth aspect of the embodiments of the present disclosure, the processor is configured to execute the following functions:

when a single-sector joint feedback period arrives, feeding back, to the network device, the CQI that is of each single sector and that is coded according to a predefined joint coding rule; or when a joint-sector joint feedback period arrives, feeding back, to the network device, the CQI that is of each joint sector and that is coded according to the predefined joint coding rule.

With reference to the fifth aspect of the embodiments of the present disclosure, in a fourth possible implementation of the fifth aspect of the embodiments of the present disclosure, the processor is configured to execute the following functions:

when a single-sector joint feedback period arrives, feeding back, to the network device, the CQI of each single sector and a precoding matrix indicating a single sector corresponding to the CQI of each single sector; or when a joint-sector joint feedback period arrives, feeding back, to the network device, the CQI of each joint sector and a precoding matrix indicating a joint sector corresponding to the CQI of each joint sector.

In an embodiment of the fifth aspect of the present disclosure, the user equipment can obtain CQIs of multiple single sectors by performing estimation once, and can obtain CQIs of multiple joint sectors by performing estimation once, so that complexity of the user equipment is reduced, and hardware resources of the user equipment are saved. In addition, the user equipment may feedback each CQI to the network device by using different rules.

A sixth aspect of the present disclosure provides a network device, and the network device is applied to a co-cell communications system. A cell in the co-cell communications system includes at least two single sectors and at least one joint sector. That is, if a cell includes two single sectors: a sector 1 and a sector 2, the cell includes one joint sector, and a mode in which the sector 1 and the sector 2 jointly provide a service is referred to as a joint-sector service mode. In an ST mode, each of the at least two single sectors is used to provide a single-sector communications service for user equipment in the cell. In an OT mode, each of the at least one joint sector is used to provide a joint-sector communications service for the user equipment. The network device includes a radio frequency module, an antenna, a processor, a bus, and a memory. The radio frequency module is connected to the antenna, and the radio frequency module, the processor, and the memory are connected by using the bus. The radio frequency module transmits a secondary pilot transmit signal of each single sector by using the antenna.

The radio frequency module executes the following function:

transmitting a secondary pilot transmit signal of each single sector to the user equipment.

The processor executes the following function:

receiving each CQI fed back by the user equipment, where each CQI is used by the network device to determine a target sector providing a communications service for the user equipment.

With reference to the sixth aspect of the embodiments of the present disclosure, in a first possible implementation of the sixth aspect of the embodiments of the present disclosure, the processor is further configured to execute the following function:

receiving a precoding matrix that is fed back by the user equipment and that indicates a sector corresponding to each CQI.

With reference to the sixth aspect of the embodiments of the present disclosure, in a second possible implementation of the sixth aspect of the embodiments of the present disclosure, the processor is configured to execute the following functions:

when a feedback period corresponding to each single sector arrives, receiving a CQI that is corresponding to each single sector and that is fed back by the user equipment; or when a feedback period corresponding to each joint sector arrives, receiving a CQI that is corresponding to each joint sector and that is fed back by the user equipment.

With reference to the sixth aspect of the embodiments of the present disclosure, in a third possible implementation of the sixth aspect of the embodiments of the present disclosure, the processor is configured to execute the following functions:

when a single-sector joint feedback period arrives, receiving a CQI that is of each single sector, coded according to a predefined joint coding rule, and fed back by the user equipment; or when a joint-sector joint feedback period arrives, receiving a CQI that is of each joint sector, coded according to the predefined joint coding rule, and fed back by the user equipment.

With reference to the sixth aspect of the embodiments of the present disclosure, in a fourth possible implementation of the sixth aspect of the embodiments of the present disclosure, the processor is configured to execute the following functions:

when a single-sector joint feedback period arrives, receiving a CQI that is of each single sector and that is fed back by the user equipment, and a precoding matrix indicating a single sector corresponding to the CQI of each single sector; or when a joint-sector joint feedback period arrives, receiving a CQI that is of each joint sector and that is fed back by the user equipment, and a precoding matrix indicating a joint sector corresponding to the CQI of each joint sector.

In an embodiment of the sixth aspect of the present disclosure, the network device receives, by using different rules, each CQI fed back by the user equipment, and determines, according to each obtained CQI, the target sector providing the communications service for the user equipment.

A seventh aspect of the present disclosure provides user equipment, and the user equipment is applied to a co-cell communications system. A cell in the co-cell communications system includes at least two single sectors and at least one joint sector. That is, if a cell includes two single sectors: a sector 1 and a sector 2, the cell includes one joint sector, and a mode in which the sector 1 and the sector 2 jointly provide a service is referred to as a joint-sector service mode. In an ST mode, each of the at least two single sectors is used to provide a single-sector communications service for user equipment in the cell. In an OT mode, each of the at least one joint sector is used to provide a joint-sector communications service for the user equipment. The user equipment includes a receiver, a processor, and a transmitter.

The receiver is configured to receive a secondary pilot receive signal that is of each single sector and that is obtained after a secondary pilot transmit signal of each single sector transmitted by a network device is transmitted by using a radio channel.

The processor is configured to: estimate a CQI of each single sector according to the secondary pilot receive signal that is of each single sector and that is received by the receiver, the pre-known secondary pilot transmit signal of each single sector, and a first precoding matrix, and estimate a CQI of each joint sector according to the secondary pilot receive signal that is of each single sector and that is received by the receiver, the pre-known secondary pilot transmit signal of each single sector, and a second precoding matrix.

The transmitter is configured to feedback each CQI to the network device.

Optionally, in some embodiments of the present disclosure, the transmitter is further configured to feedback, to the network device, a precoding matrix indicating a sector corresponding to each CQI.

Optionally, in some embodiments of the present disclosure, the transmitter is configured to: when a feedback period corresponding to each single sector arrives, feedback, to the network device, the CQI corresponding to each single sector; or when a feedback period corresponding to each joint sector arrives, feedback, to the network device, the CQI corresponding to each joint sector.

Optionally, in some embodiments of the present disclosure, the transmitter is configured to: when a single-sector joint feedback period arrives, feedback, to the network device, the CQI that is of each single sector and that is coded according to a predefined joint coding rule; or when a joint-sector joint feedback period arrives, feedback, to the network device, the CQI that is of each joint sector and that is coded according to the predefined joint coding rule.

Optionally, in some embodiments of the present disclosure, the transmitter is configured to: when a single-sector joint feedback period arrives, feedback, to the network device, the CQI of each single sector and a precoding matrix indicating a single sector corresponding to the CQI of each single sector; or when a joint-sector joint feedback period arrives, feedback, to the network device, the CQI of each joint sector and a precoding matrix indicating a joint sector corresponding to the CQI of each joint sector.

In an embodiment of the seventh aspect of the present disclosure, the user equipment can obtain CQIs of multiple single sectors by performing estimation once, and can obtain CQIs of multiple joint sectors by performing estimation once, so that complexity of the user equipment is reduced, and hardware resources of the user equipment are saved. In addition, the user equipment may feedback each obtained CQI to the network device by using different rules.

An eighth aspect of the present disclosure provides a network device, and the network device is applied to a co-cell communications system. A cell in the co-cell communications system includes at least two single sectors and at least one joint sector. That is, if a cell includes two single sectors: a sector 1 and a sector 2, the cell includes one joint sector, and a mode in which the sector 1 and the sector 2 jointly provide a service is referred to as a joint-sector service mode. In an ST mode, each of the at least two single sectors is used to provide a single-sector communications service for user equipment in the cell. In an OT mode, each of the at least one joint sector is used to provide a joint-sector communications service for the user equipment. The network device includes a transmitter and a receiver.

The transmitter is configured to transmit a secondary pilot transmit signal of each single sector to the user equipment.

The receiver is configured to receive each CQI fed back by the user equipment, where each CQI is used by the network device to determine a target sector providing a communications service for the user equipment.

Optionally, in some embodiments of the present disclosure, the receiver is further configured to receive a precoding matrix that is fed back by the user equipment and that indicates a sector corresponding to each CQI.

Optionally, in some embodiments of the present disclosure, the receiver is configured to: when a feedback period corresponding to each single sector arrives, receive a CQI that is corresponding to each single sector and that is fed back by the user equipment; or when a feedback period corresponding to each joint sector arrives, receive a CQI that is corresponding to each joint sector and that is fed back by the user equipment. Optionally, in some embodiments of the present disclosure, the receiver is configured to: when a single-sector joint feedback period arrives, receive a CQI that is of each single sector, coded according to a predefined joint coding rule, and fed back by the user equipment; or when a joint-sector joint feedback period arrives, receive a CQI that is of each joint sector, coded according to the predefined joint coding rule, and fed back by the user equipment.

Optionally, in some embodiments of the present disclosure, the receiver is configured to: when a single-sector joint feedback period arrives, receive a CQI that is of each single sector and that is fed back by the user equipment, and a precoding matrix indicating a single sector corresponding to the CQI of each single sector; or when a joint-sector joint feedback period arrives, receive a CQI that is of each joint sector and that is fed back by the user equipment, and a precoding matrix indicating a joint sector corresponding to the CQI of each joint sector.

In an embodiment of the eighth aspect of the present disclosure, the network device receives, by using different rules, each CQI fed back by the user equipment, and determines, according to each obtained CQI, the target sector providing the communications service for the user equipment.

It should be noted that the technical solutions of the present disclosure essentially, or the part contributing to the prior art, or all or a part of the technical solutions may be implemented in the form of a computer software product, and the computer software product is stored in a storage medium. According to a ninth aspect, an embodiment of the present disclosure provides a storage medium, and the storage medium stores a program for executing the following instructions:

receiving, by user equipment, a secondary pilot receive signal that is of each single sector and that is obtained after a secondary pilot transmit signal of each single sector transmitted by a network device is transmitted by using a radio channel; estimating, by the user equipment, a channel matrix according to the secondary pilot receive signal of each single sector and the pre-known secondary pilot transmit signal of each single sector; estimating, by the user equipment, a CQI of each single sector according to the channel matrix and a first precoding matrix, and estimating a CQI of each joint sector according to the channel matrix and a second precoding matrix; and feeding back, by the user equipment, each CQI to the network device.

The storage medium includes any medium that can store program code, such as a USB flash drive, a removable hard disk, a read-only memory (ROM), a random access memory (RAM), a magnetic disk, or an optical disc.

A tenth aspect of the present disclosure provides a co-cell communications system, including user equipment and a network device. A cell in the co-cell communications system includes at least two single sectors and at least one joint sector. That is, if a cell includes two single sectors: a sector 1 and a sector 2, the cell includes one joint sector, and a mode in which the sector 1 and the sector 2 jointly provide a service is referred to as a joint-sector service mode. In an ST mode, each of the at least two single sectors is used to provide a single-sector communications service for user equipment in the cell. In an OT mode, each of the at least one joint sector is used to provide a joint-sector communications service for the user equipment. The user equipment is the user equipment in the third aspect or any possible implementation of the third aspect, and the network device is the network device in the fourth aspect or any possible implementation of the fourth aspect.

It may be learned from the foregoing technical solutions that the embodiments of the present disclosure have the following advantages:

In the technical solutions of the present disclosure, when the user equipment is in a co-cell mode, the user equipment first estimates the channel matrix according to the secondary pilot receive signal of each single sector and the pre-known secondary pilot transmit signal of each corresponding single sector, and then estimates the CQI of each single sector according to the channel matrix and the first precoding matrix, so that CQIs of all single sectors are obtained at a time. This improves operating efficiency of the user equipment and saves hardware resources of the UE. When receiving each CQI, the network device may determine, according to values of different CQIs, the target sector providing the communications service for the user equipment.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION

Figure 1:
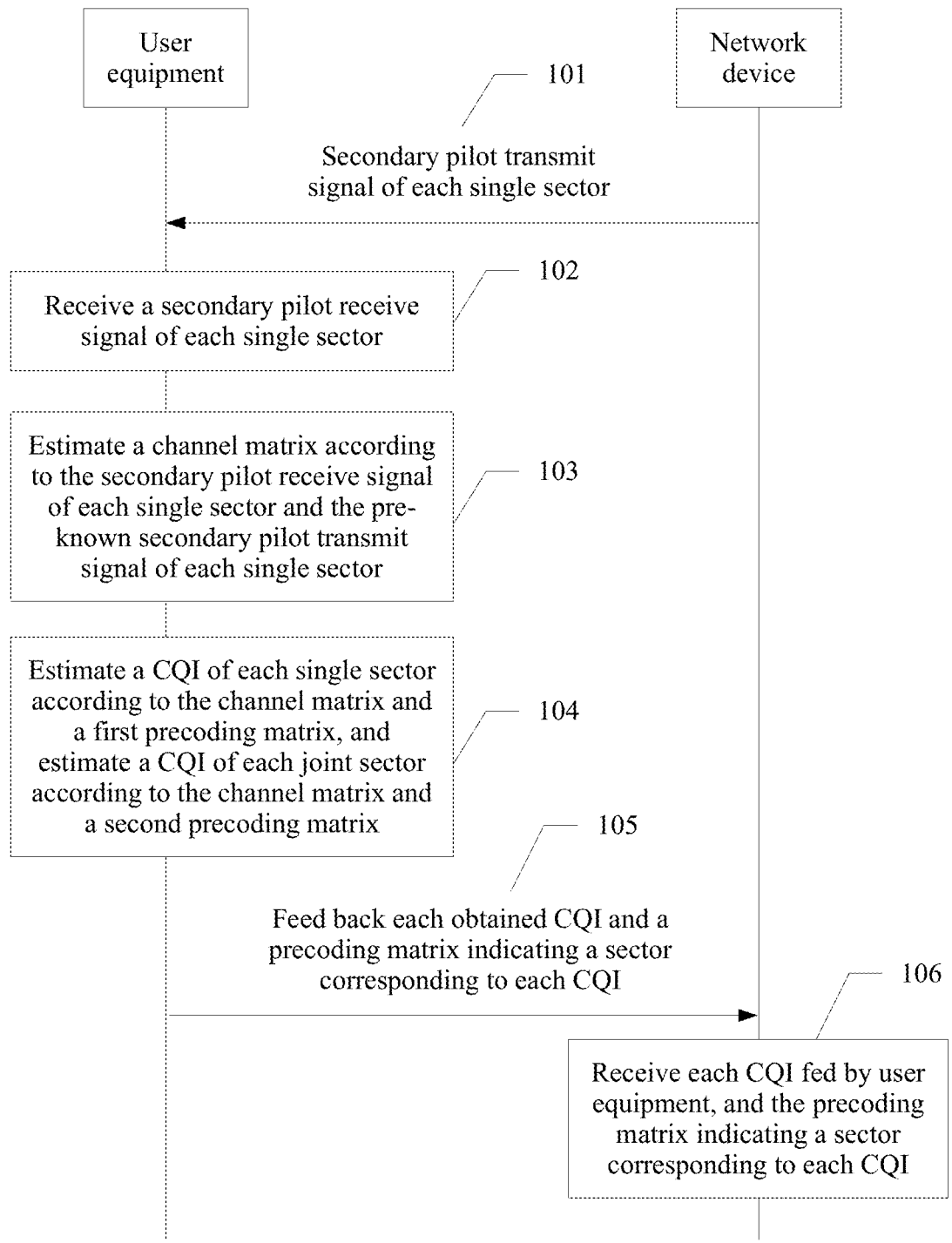
FIG. 1 is a schematic diagram of an embodiment of a channel quality indicator (CQI) feedback method according to an embodiment of the present disclosure.

Embodiments of the present disclosure provide a channel quality indicator (CQI) feedback method, user equipment, and a network device, so as to reduce complexity of the user equipment, and save hardware resources of the user equipment.

To make persons skilled in the art understand the technical solutions in the present disclosure better, the following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

A co-cell communications system includes user equipment and a network device. A cell in the co-cell communications system includes at least two single sectors and at least one joint sector, each of the at least two single sectors is used to provide a single-sector communications service for user equipment in the cell, and each of the at least one joint sector is used to provide a joint-sector communications service for the user equipment. The user equipment needs to feed back a CQI of a sector to the network device, and the network device determines, according to the CQI, a specific single sector or a specific joint sector providing a communications service for the user equipment.

When the UE is in a co-cell mode, CQI estimation is performed in a co-cell network by using a precoding matrix. The UE estimates a CQI of a sector 1 in a single transmission (ST) mode and a CQI of a sector 2 in the ST mode by using a precoding matrix and a multiple-input multiple-output (MIMO) channel estimation module, that is, by performing CQI estimation once; and estimates a joint CQI of the sector 1 and the sector 2 in an omni-directional transmission (OT) mode by performing CQI estimation once again. The UE obtains three different CQIs by performing estimation twice.

In the embodiments of the present disclosure, the user equipment feeds back each obtained CQI to the network device according to different feedback rules, so that the network device learns, according to the rules, a sector corresponding to each CQI. It should be noted that the different feedback rules are defined by the user equipment and the network device. For ease of understanding, the following describes a specific implementation procedure in which the user equipment feeds back each CQI to the network device by using different rules in the embodiments of the present disclosure.

1. User equipment feeds back each CQI to a network device by using a precoding rule. Referring to FIG. 1, a channel quality indicator (CQI) feedback method in an embodiment of the present disclosure is described as follows:

101. A network device transmits a secondary pilot transmit signal of each single sector to user equipment.

In this embodiment, the network device includes a network controller and a base station. The network controller (RNC) sends Iub signaling to the base station (NodeB), so as to configure a co-cell mode, and the RNC sends radio resource control RRC signaling to the user equipment UE by using the base station, so that the user equipment is in the co-cell mode. A cell in a co-cell communications system includes at least two single sectors and at least one joint sector. The network device configures a secondary pilot for each single sector, and configures a primary pilot for each joint sector. The network device sends the secondary pilot transmit signal of each single sector to the user equipment.

For example, if a cell in the co-cell communications system includes two single sectors: a sector 1 and a sector 2, the cell includes one joint sector, and the joint sector is generally an area covered by at least two sectors. The network device configures a secondary common pilot channel S-CPICH1 for the sector 1, configures a secondary common pilot channel S-CPICH2 for the sector 2, and configures a primary common pilot channel P-CPICH for the joint sector. The network device transmits a secondary pilot transmit signal s1 of the sector 1 and a secondary pilot transmit signal s2 of the sector 2 to the user equipment. It should be noted that in actual application, a cell in the co-cell communications system includes at least two sectors.

102. The user equipment receives a secondary pilot receive signal that is of each single sector and that is obtained after the secondary pilot transmit signal of each single sector transmitted by the network device is transmitted by using a radio channel.

In this embodiment, after the network device transmits the secondary pilot transmit signals of the sector 1 and the sector 2 to the user equipment, the user equipment receives a secondary pilot receive signal y1 that is of the sector 1 and that is obtained after the secondary pilot transmit signal s1 of the sector 1 is transmitted by using the radio channel, and receives a secondary pilot receive signal y2 that is of the sector 2 and that is obtained after the secondary pilot transmit signal s2 of the sector 2 is transmitted by using the radio channel.

In this embodiment of the present disclosure, the user equipment estimates a CQI of each single sector according to the secondary pilot receive signal of each single sector, the pre-known secondary pilot transmit signal of each single sector, and a first precoding matrix, and estimates a CQI of each joint sector according to the secondary pilot receive signal of each single sector, the pre-known secondary pilot transmit signal of each single sector, and a second precoding matrix. Actually, this may be implemented by performing step 103 and step 104, and details are as follows:

103. The user equipment estimates a channel matrix according to the secondary pilot receive signal of each single sector and the pre-known secondary pilot transmit signal of each single sector.

In this embodiment, when the user equipment receives the secondary pilot receive signal y1 of the sector 1 and the secondary pilot receive signal y2 of the sector 2, it should be noted that the secondary pilot transmit signal of each single sector may be specified by using a protocol, or may be set by using a message delivered in a network, and is pre-known to both the network device and the user equipment. That is, the secondary pilot transmit signals s1 and s2 of the sector 1 and the sector 2 are known quantities. The user equipment may estimate a channel matrix H according to the secondary pilot receive signals y1 and y2 of the sector 1 and the sector 2 and the secondary pilot transmit signals s1 and s2 of the sector 1 and the sector 2 by using the following formula (1-1):

$$\begin{bmatrix} y1 \\ y2 \end{bmatrix} = H \begin{bmatrix} s1 \\ s2 \end{bmatrix} \qquad \text{Formula (1-1)}$$

$$\begin{bmatrix} y1 \\ y2 \end{bmatrix} = H \begin{bmatrix} s1 \\ s2 \end{bmatrix} + f(N) + f(I) + f(\ldots) \qquad \text{Formula (1-2)}$$

In this embodiment of the present disclosure, variables included in the formula (1-1) are actually not only the secondary pilot receive signals, the channel matrix, and the secondary pilot transmit signals, but also noise (N), interference (I), energy attenuation, and another factor in a signal transmission process. The formula (1-1) may be applied to all these factors. For example, as shown in the formula (1-2), the formula (1-1) is only a concise expression, and does not enumerate these factors. The following formulas (1-3) and (1-4) are both concise expressions. H in the formula (1-1) is a channel matrix, and is a to-be-estimated variable.

104. The user equipment estimates a CQI of each single sector according to the channel matrix and a first precoding matrix, and estimates a CQI of each joint sector according to the channel matrix and a second precoding matrix.

In this embodiment, if the NodeB provides services of the sector 1 and the sector 2 in an ST mode by using a MIMO dual-stream mode, that is, a data stream sent by the network device in the sector 1 is d1, and a data stream sent by the network device in the sector 2 is d2. If the NodeB uses the first precoding matrix $$V1 = \begin{bmatrix} 1 & 0 \\ 0 & 1 \end{bmatrix},$$

a signal received by the UE is shown in formula (1-3):

$$\begin{bmatrix} y1 \\ y2 \end{bmatrix} = H \begin{bmatrix} 1 & 0 \\ 0 & 1 \end{bmatrix} \begin{bmatrix} d1 \\ d2 \end{bmatrix} = HV1 \begin{bmatrix} d1 \\ d2 \end{bmatrix} \qquad \text{Formula (1-3)}$$

In this assumption, forms of the two data streams are totally the same as a MIMO dual-stream form. In this way, same as a MIMO receiver, the UE may estimate CQIs of the two sectors in the ST mode by using the precoding matrix V1. An equivalent channel that d1 passes through is corresponding to a CQI 1 of the sector 1 in the ST mode, and an equivalent channel that d2 passes through is corresponding to a CQI 2 of the sector 2 in the ST mode.

In this embodiment, for the user equipment UE, if the NodeB provides services of the sector 1 and the sector 2 in an OT mode by reusing a MIMO single-stream mode, that is, data streams sent by the network device in the sector 1 and the sector 2 are both d1. If the NodeB uses the second precoding matrix $$V2 = \begin{bmatrix} 1 \\ 1 \end{bmatrix},$$

a signal received by the UE is shown in formula (1-4):

$$\begin{bmatrix} y1 \\ y2 \end{bmatrix} = H \begin{bmatrix} 1 \\ 1 \end{bmatrix} d1 = HV2d1 \qquad \text{Formula (1-4)}$$

In this assumption, forms of the data stream d1 in the OT mode and a MIMO single stream are totally the same, and the single stream herein may be understood as beam forming based on a codebook. The UE may estimate a CQI of the sector 1 and the sector 2 in a joint service mode by reusing a MIMO single-stream receiver and by using the precoding matrix $$V2 = \begin{bmatrix} 1 \\ 1 \end{bmatrix}.$$

An equivalent channel that d1 passes through is corresponding to a CQI of a joint sector in the OT mode.

In this embodiment of the present disclosure, the first precoding matrix is not limited to $$V1 = \begin{bmatrix} 1 & 0 \\ 0 & 1 \end{bmatrix},$$

and is generally a complex matrix U with n rows and n columns that meets the following relationship: $U^H U = U U^H = E_n * a$, where $U^H$ is conjugate transposition of U, $E_n$ is an n-order identity matrix, and a is a constant. The second precoding matrix is not limited to $$V2 = \begin{bmatrix} 1 \\ 1 \end{bmatrix},$$

and is generally a column vector extracted from the complex matrix U with n rows and n columns that meets the foregoing relationship.

105. The user equipment feeds back each obtained CQI to the network device, and feeds back, to the network device, a precoding matrix indicating a sector corresponding to each CQI.

In this embodiment, after estimating the CQI 1 of the sector 1, the CQI 2 of the sector 2, and a CQI 3 of the joint sector, the UE needs to feed back the CQIs to the NodeB, and the NodeB can distinguish between sector types corresponding to the CQIs. Therefore, when feeding back the CQIs, the UE may indicate, in an explicit manner, three types corresponding to the CQIs, including the sector 1 in the ST mode, the sector 2 in the ST mode, and the joint sector in the OT mode. For example, indication information is further fed back when the CQI 1 of the sector 1 in the ST mode is being fed back. The indication information is a precoding matrix coded by the network device by using a precoding rule, and is used to indicate a sector corresponding to a fed-back CQI. That is, there are multiple precoding matrices, each precoding matrix has a corresponding sequence number, and the sequence number corresponds one-to-one to the indication information. After receiving the indication information, the NodeB learns that a value of the CQI 1 is corresponding to a value of the sector 1 in the ST mode, and the indication information may be used for indication in a precoding codebook manner. It should be noted that the precoding rule is predefined by the network device and the user equipment.

For example, a codebook is predefined, and the codebook has three different precoding matrices: a first precoding matrix $$\begin{bmatrix} 1 \\ 0 \end{bmatrix}$$

representing the sector 1 in the ST mode, a second precoding matrix $$\begin{bmatrix} 0 \\ 1 \end{bmatrix}$$

representing the sector 2 in the ST mode, and a third precoding matrix $$\begin{bmatrix} 1 \\ 1 \end{bmatrix}$$

representing the joint sector in the OT mode. The three precoding matrices may be indicated as 10, 01, and 11 by using 2 bits. The NodeB receives the codebook, and determines a specific mode in the three modes to provide a service for the UE.

Figure 2:
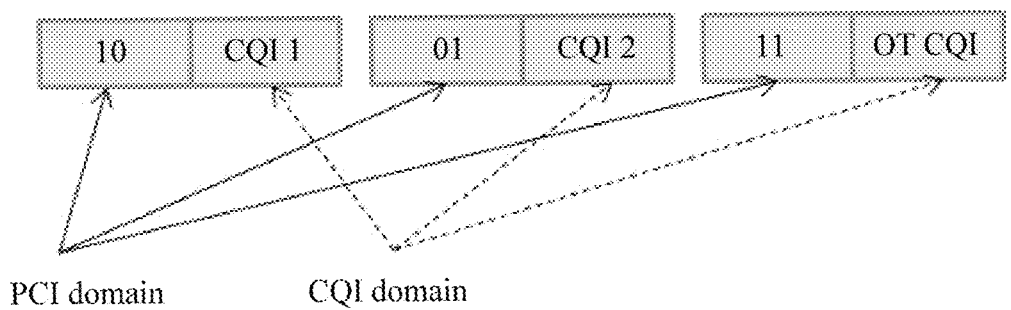
FIG. 2 is a schematic diagram of an explicit feedback manner according to an embodiment of the present disclosure.

In this embodiment of the present disclosure, the 2-bit information may be carried in a precoding control indication (PCI) domain of a high speed dedicated physical control channel (HS-DPCCH). When a co-cell receive mode is configured for the UE, the PCI of the HS-DPCCH carries the 2-bit information. A schematic diagram of such an explicit feedback manner is shown in FIG. 2. In actual application, the predefined codebook includes more than three precoding matrices, and a quantity of precoding matrices is generally determined according to an actual quantity of sectors and an actual quantity of joint sectors.

106. The network device receives each CQI fed back by the user equipment, and receives the precoding matrix that is fed back by the user equipment and that indicates a sector corresponding to each CQI, where each CQI is used by the network device to determine a target sector providing a communications service for the user equipment. In this embodiment, after the user equipment feeds back the CQI 1 of the sector 1, the CQI 2 of the sector 2, the CQI 3 of the joint sector, and a precoding matrix corresponding to each channel quality indicator, the network device receives the CQI 1 of the sector 1 and the first precoding matrix, the CQI 2 of the sector 2 and the second precoding matrix, and the CQI 3 of the joint sector and the third precoding matrix. The network device learns, according to the first precoding matrix, that the CQI 1 is a channel quality indicator of the sector 1, learns, according to the second precoding matrix, that the CQI 2 is a channel quality indicator of the sector 2, and learns, according to the third precoding matrix, that the CQI 3 is a channel quality indicator of the joint sector. The network device may determine, according to the received CQI 1, CQI 2, and CQI 3, that the sector 1, the sector 2, or the joint sector provides the communications service for the user equipment. For example, the network device determines, according to max (CQI 1, CQI 2, CQI 3), a service mode provided for the UE, and if max (CQI 1, CQI 2, CQI 3)=CQI 1, the network device determines that a sector whose channel quality indicator is the CQI 1 provides the communications service for the UE, and learns, according to the first precoding matrix, that the sector corresponding to the CQI 1 is the sector 1, so that the network device allocates the sector 1 to provide the communications service for the UE.

In this embodiment of the present disclosure, the user equipment can obtain channel quality indicators of two single sectors by performing calculation once, and a MIMO dual-stream transmission technology is applied, so that complexity of the user equipment is reduced, and hardware resources of the user equipment are saved. The user equipment feeds back a channel quality indicator of each sector by using the precoding rule, and a PCI domain in a multiple-input multiple-output MIMO technology is used, thereby ensuring better security.

Figure 3:
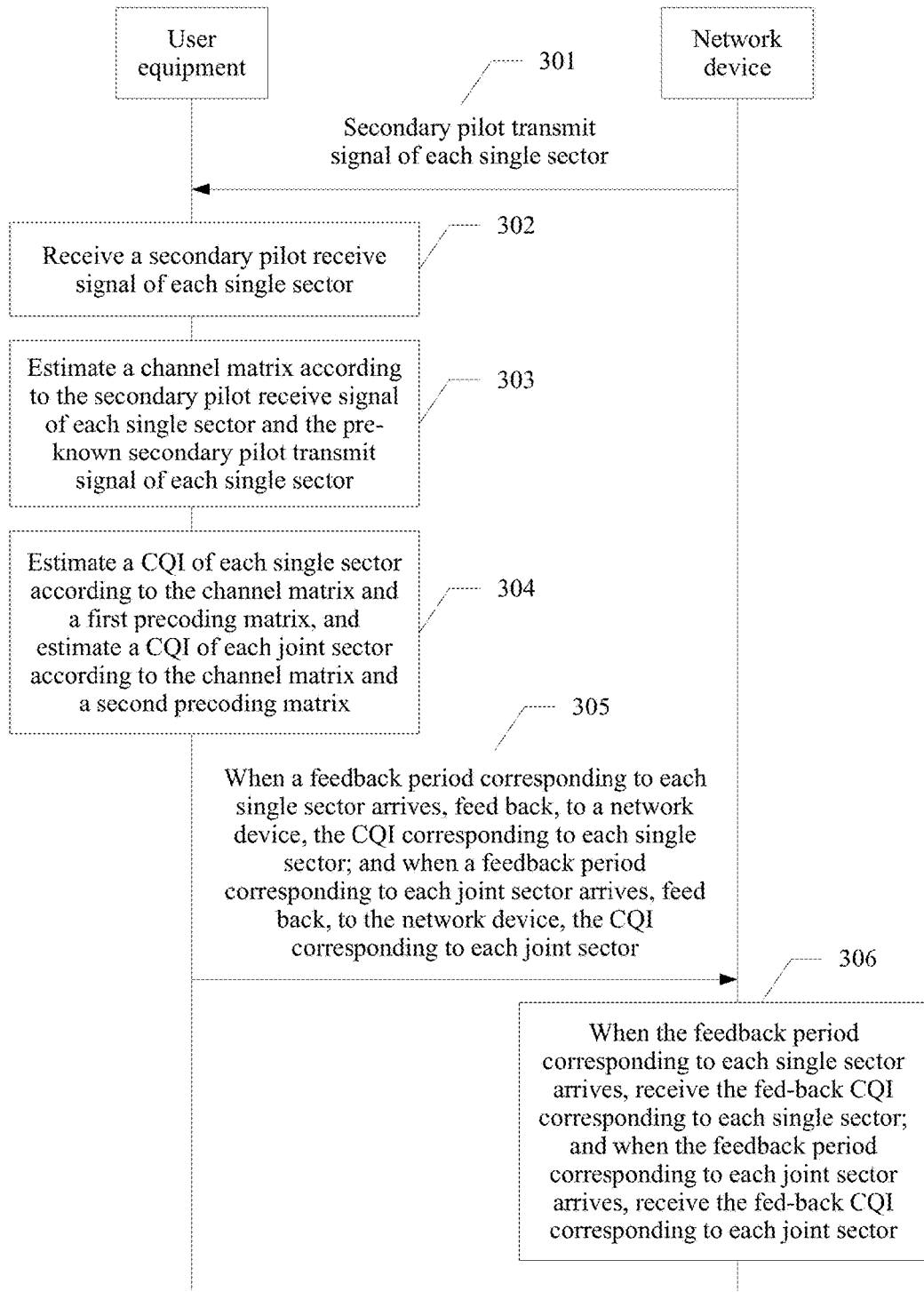
FIG. 3 is a schematic diagram of another embodiment of a channel quality indicator (CQI) feedback method according to an embodiment of the present disclosure.

2. User equipment feeds back each CQI to a network device by using a period feedback rule. Referring to FIG. 3, another embodiment of a channel quality indicator (CQI) feedback method in an embodiment of the present disclosure is described as follows:

301. A network device transmits a secondary pilot transmit signal of each single sector to user equipment.

302. The user equipment receives a secondary pilot receive signal that is of each single sector and that is obtained after the secondary pilot transmit signal of each single sector transmitted by the network device is transmitted by using a radio channel.

303. The user equipment estimates a channel matrix according to the secondary pilot receive signal of each single sector and the pre-known secondary pilot transmit signal of each single sector.

304. The user equipment estimates a CQI of each single sector according to the channel matrix and a first precoding matrix, and estimates a CQI of each joint sector according to the channel matrix and a second precoding matrix.

In this embodiment of the present disclosure, step 301 to step 304 are the same as step 101 to step 104 in the embodiment shown in FIG. 1, and details are not described herein again.

305. When a feedback period corresponding to each single sector arrives, the user equipment feeds back, to the network device, the CQI corresponding to each single sector; or when a feedback period corresponding to each joint sector arrives, feeds back, to the network device, the CQI corresponding to each joint sector.

Figure 4:
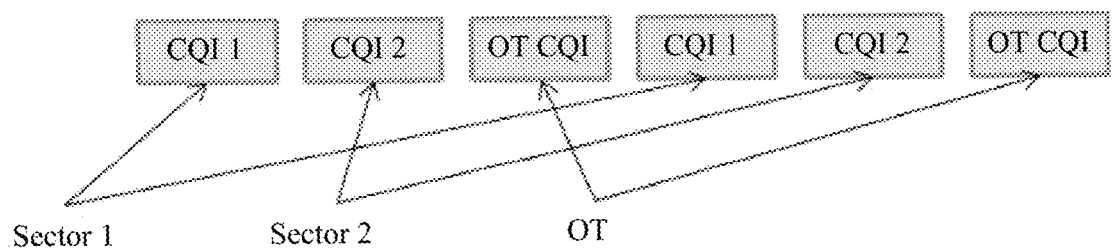
FIG. 4 is a schematic diagram of an implicit feedback manner according to an embodiment of the present disclosure.

In this embodiment, after the user equipment estimates a CQI 1 of a sector 1, a CQI 2 of a sector 2, and a CQI 3 of a joint sector, the user equipment feeds back each obtained CQI according to a period feedback rule predefined by the user equipment and the network device. For example, the CQI 1 of the sector 1 is fed back to the network device in a first period, the fourth period, . . . , or the $(1+3n)^{th}$ period (n is an integer), the CQI 2 of the sector 2 is fed back to the network device in the second period, the fifth period, . . . , and the $(2+3n)^{th}$ (n is an integer) period, and the CQI 3 of the joint sector is fed back to the network device in the third period, the sixth period, . . . , and the $(3+3n)^{th}$ (n in an integer) period. Duration of each period is T1, and duration of T1 may be set according to an actual requirement. Such a feedback manner may be referred to as an implicit feedback manner, and a schematic diagram of the implicit feedback manner is shown in FIG. 4.

In this embodiment of the present disclosure, feedback period locations of the CQI 1 of the sector 1, the CQI 2 of the sector 2, and the CQI 3 of the joint sector may be different from each other, or any at least two feedback period locations may be the same. For example, the CQI 2 of the sector 2 or the CQI 3 of the joint sector may be fed back to the network device in the first period, the fourth period, . . . , and the (1+3n) (n is an integer) period. This is not specifically limited.

306. When the feedback period corresponding to each single sector arrives, the network device receives the CQI that is corresponding to each single sector and that is fed back by the user equipment; or when the feedback period corresponding to each joint sector arrives, receives the CQI that is corresponding to each joint sector and that is fed back by the user equipment, where each CQI is used by the network device to determine a target sector providing a communications service for the user equipment.

In this embodiment, the network device learns, according to the period feedback rule predefined by the user equipment and the network device, that the CQI 1 received by the network device in the first period, the fourth period, . . . , and the $(1+3n)^{th}$ (n is an integer) period is a channel quality indicator of the sector 1, the CQI 2 received in the second period, the fifth period, . . . , and the $(2+3n)^{th}$ (n is an integer) period is a channel quality indicator of the sector 2, and the CQI 3 received in the third period, the sixth period, . . . , and the $(3+3n)^{th}$ (n is an integer) period is a channel quality indicator of the joint sector. The network device determines, according to the received CQI 1, CQI 2, and CQI 3, that the sector 1, the sector 2, or the joint sector provides the communications service for the user equipment. For example, the network device determines, according to max (CQI 1, CQI 2, CQI 3), a service mode provided for the UE, and if max (CQI 1, CQI 2, CQI 3)=CQI 2, the network device determines that a sector whose channel quality indicator is the CQI 2 provides the communications service for the UE, and learns, according to the received feedback period, that the sector corresponding to the CQI 2 is the sector 2, so that the network device allocates the sector 2 to provide the communications service for the UE.

In this embodiment of the present disclosure, the user equipment feeds back the channel quality indicators of each single sector and each joint sector by using the period feedback rule predefined by the user equipment and the network device, and the network device learns, according to the period feedback rule, that a sector corresponding to each feedback period. When feeding back the channel quality indicators, the user equipment does not need to feed back corresponding sector indication information, so that network resources are saved.

Figure 5:
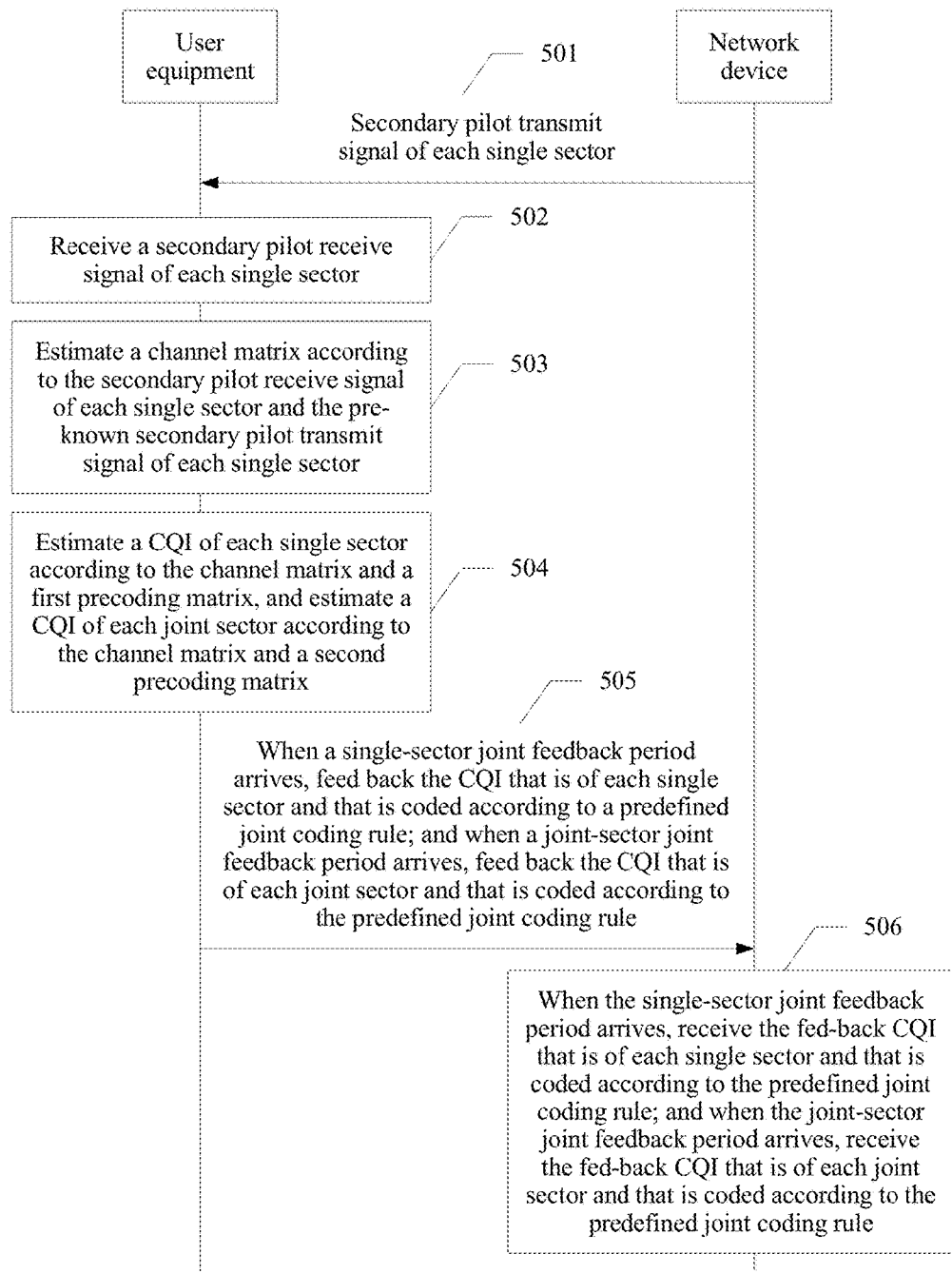
FIG. 5 is a schematic diagram of another embodiment of a channel quality indicator (CQI) feedback method according to an embodiment of the present disclosure.

2. User equipment feeds back each CQI to a network device by using a period feedback rule and a predefined joint coding rule. Referring to FIG. 5, another embodiment of a channel quality indicator (CQI) feedback method in an embodiment of the present disclosure is described as follows:

501. A network device transmits a secondary pilot transmit signal of each single sector to user equipment.

502. The user equipment receives a secondary pilot receive signal that is of each single sector and that is obtained after the secondary pilot transmit signal of each single sector transmitted by the network device is transmitted by using a radio channel.

503. The user equipment estimates a channel matrix according to the secondary pilot receive signal of each single sector and the pre-known secondary pilot transmit signal of each single sector.

504. The user equipment estimates a CQI of each single sector according to the channel matrix and a first precoding matrix, and estimates a CQI of each joint sector according to the channel matrix and a second precoding matrix.

In this embodiment of the present disclosure, step 501 to step 504 are the same as step 101 to step 104 in the embodiment shown in FIG. 1, and details are not described herein again.

505. When a single-sector joint feedback period arrives, the user equipment feeds back, to the network device, the CQI that is of each single sector and that is coded according to a predefined joint coding rule; or when a joint-sector joint feedback period arrives, feeds back, to the network device, the CQI that is of each joint sector and that is coded according to the predefined joint coding rule.

Figure 6:
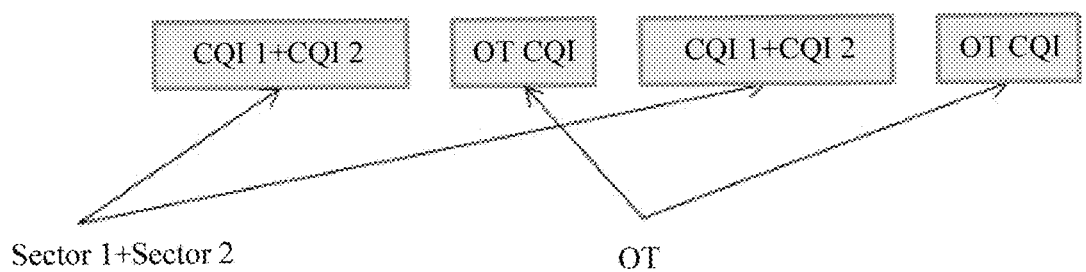
FIG. 6 is a schematic diagram of feedback performed by using a joint coding rule in an implicit feedback manner according to an embodiment of the present disclosure.

In this embodiment, when the user equipment estimates a CQI 1 of a sector 1, a CQI 2 of a sector 2, and a CQI 3 of a joint sector, the user equipment may perform predefined joint coding on the CQI 1 of the sector 1 and the CQI 2 of the sector 2 according to the predefined joint coding rule. It should be noted that the predefined joint coding rule and the period feedback rule are predefined by the network device and the user equipment. In an example of the predefined joint coding rule, when the user equipment performs predefined joint coding, if four bits a1, a2, a3, and a4 are coded, a1 and a2 are high bits and a3 and a4 are low bits, or a3 and a4 are high bits and a1 and a2 are low bits. Herein, it is specified that the high bits a1 and a2 are the CQI 1 of the sector 1, and the low bits a3 and a4 are the CQI 2 of the sector 2. The user equipment may feed back, to the network device, jointly coded channel quality indicators of the sector 1 and the sector 2 according to the period feedback rule in the first period, the third period, . . . , and the $(1+2n)^{th}$ (n is an integer) period, and the user equipment may feed back, to the network device, a channel quality indicator of the joint sector according to the period feedback rule in the second period, the fourth period, . . . , and the $(2+2n)^{th}$ (n is an integer) period. Duration of each period is T1. Such a feedback manner is referred to as an implicit feedback manner, and a schematic diagram of feedback performed by using a joint coding rule in the implicit feedback manner is shown in FIG. 6.

In this embodiment of the present disclosure, according to the predefined joint coding rule, the high bits are the CQI 2 of the sector 2, and the low bits are the CQI 1 of the sector 1. When multiple sectors are included, the predefined joint coding rule may be as follows: For example, during coding, the first to the fifth bits are a CQI 1 of a sector 1, the sixth to the tenth bits are a CQI 2 of a sector 2, the eleventh to the fifteenth bits are a CQI 3 of a sector 3, and so on. If three single sectors are included, there are three joint sectors: a first joint sector of the sector 1 and the sector 2, a second joint sector of the sector 2 and the sector 3, and a third joint sector of the sector 1, the sector 2, and the sector 3. During coding, the first to the fifth bits are a CQI of the first joint sector, the sixth to the tenth bits are a CQI of the joint sector, and the eleventh to the fifteenth bits are a CQI of the third joint sector. The predefined joint coding rule for multiple joint sectors is merely an example herein, and a predefined joint coding rule for multiple single sectors is similar.

506. When the single-sector joint feedback period arrives, the network device receives the CQI that is of each single sector, coded according to a predefined joint coding rule, and fed back by the user equipment; or when a joint-sector joint feedback period arrives, receives the CQI that is of each joint sector, coded according to the predefined joint coding rule, and fed back by the user equipment, where each CQI is used by the network device to determine a target sector providing a communications service for the user equipment.

In this embodiment, the network device learns, according to the period feedback rule, that jointly coded CQIs of the sector 1 and the sector 2 are received in the first period, the third period, . . . , and the $(1+2n)^{th}$ (n is an integer) period. After decoding, the network device learns, according to the predefined joint coding rule, that the CQI 1 of the high bits is a channel quality indicator of the sector 1, and the CQI 2 of the low bits is a channel quality indicator of the sector 2, and learns that the CQI of the joint sector is received in the second period, the fourth period, . . . , and the $(2+2n)^{th}$ (n is an integer) period. The network device determines, according to the received CQI 1, CQI 2, and CQI 3, that the sector 1, the sector 2, or the joint sector provides the communications service for the user equipment. For example, the network device determines, according to max (CQI 1, CQI 2, CQI 3), a service mode provided for the UE, and if max (CQI 1, CQI 2, CQI 3)=CQI 1, the network device determines that a sector whose channel quality indicator is the CQI 1 provides the communications service for the UE. The network device learns, according to the period feedback rule, that the jointly coded CQIs of the sector 1 and the sector 2 are received in the first period, the third period, . . . , and the $(1+2n)^{th}$ (n is an integer) period, and the network device learns, according to the predefined joint coding rule, that a sector corresponding to the CQI 1 of the high bits is the sector 1, and allocates the sector 1 to provide the communications service for the UE. In this embodiment of the present disclosure, the user equipment first performs joint coding on the CQIs of the sector 1 and the sector 2 according to the predefined joint coding rule, and then feeds back the jointly coded CQIs of the sector 1 and the sector 2 and the CQI of the joint sector according to the period feedback rule. The network device learns, according to the predefined joint coding rule and the period feedback rule, a corresponding CQI and sector indication information corresponding to each CQI. The CQIs and the sector indication information are fed back in this way, so that complexity of the user equipment is reduced, and security of the sector indication information is improved.

4. User equipment feeds back each CQI to a network device by using a precoding rule and a period feedback rule.

Figure 7:
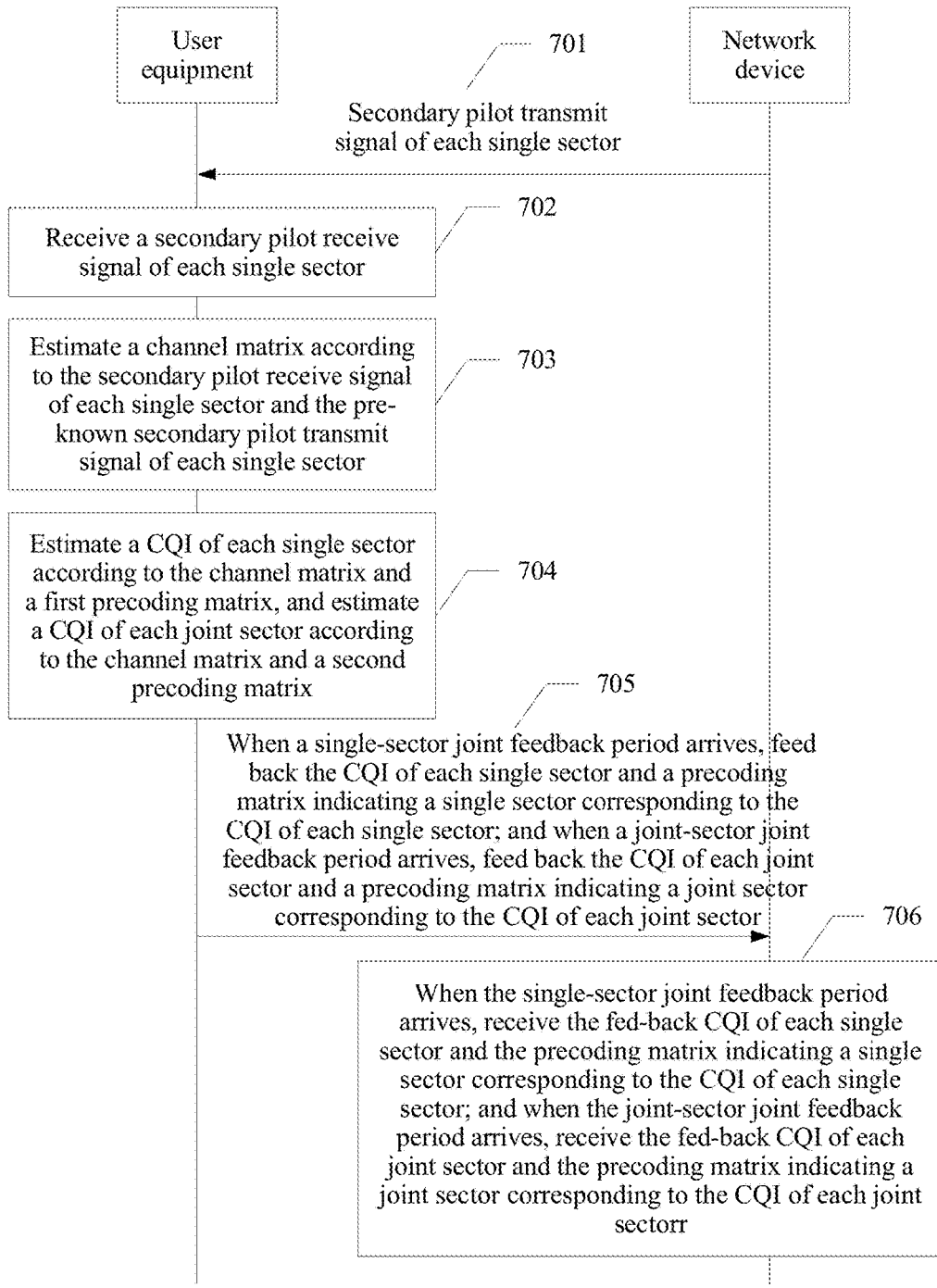
FIG. 7 is a schematic diagram of another embodiment of a channel quality indicator (CQI) feedback method according to an embodiment of the present disclosure.

Referring to FIG. 7, another embodiment of a channel quality indicator (CQI) feedback method in an embodiment of the present disclosure is described as follows:

701. A network device transmits a secondary pilot transmit signal of each single sector to user equipment.

702. The user equipment receives a secondary pilot receive signal that is of each single sector and that is obtained after the secondary pilot transmit signal of each single sector transmitted by the network device is transmitted by using a radio channel.

703. The user equipment estimates a channel matrix according to the secondary pilot receive signal of each single sector and the pre-known secondary pilot transmit signal of each single sector.

704. The user equipment estimates a CQI of each single sector according to the channel matrix and a first precoding matrix, and estimates a CQI of each joint sector according to the channel matrix and a second precoding matrix.

In this embodiment of the present disclosure, step 701 to step 704 are the same as step 101 to step 104 in the embodiment shown in FIG. 1, and details are not described herein again.

705. When a single-sector joint feedback period arrives, the user equipment feeds back, to the network device, the CQI of each single sector and a precoding matrix indicating a single sector corresponding to the CQI of each single sector; or when a joint-sector joint feedback period arrives, feeds back, to the network device, the CQI of each joint sector and a precoding matrix indicating a joint sector corresponding to the CQI of each joint sector.

In this embodiment, when the user equipment estimates a CQI 1 of a sector 1, a CQI 2 of a sector 2, and a CQI 3 of a joint sector, the user equipment predefines a codebook according to the precoding rule. The codebook has three different precoding matrices: a first precoding matrix $$\begin{bmatrix} 1 \\ 0 \end{bmatrix}$$

representing the sector 1 in an ST mode, a second precoding matrix $$\begin{bmatrix} 0 \\ 1 \end{bmatrix}$$

representing the sector 2 in the ST mode, and a third precoding matrix $$\begin{bmatrix} 1 \\ 1 \end{bmatrix}$$

representing the joint sector in an OT mode. The three precoding matrices may be indicated as 10, 01, and 11 by using 2 bits. A NodeB receives the codebook, and determines a specific mode in the three modes to provide a service for the UE. The first precoding matrix is used to indicate that the CQI 1 is a channel quality indicator of the sector 1, the second precoding matrix is used to indicate that the CQI 2 is a channel quality indicator of the second sector 2, and the third precoding matrix is used to indicate that the CQI 3 is a channel quality indicator of the joint sector.

Figure 8:
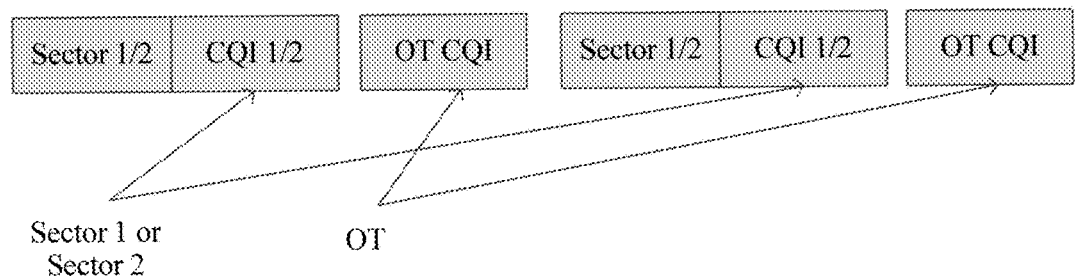
FIG. 8 is a schematic diagram of a feedback manner combining an implicit manner and an explicit manner according to an embodiment of the present disclosure.

Then, the user equipment feeds back, to the network device, the CQI 1 of the sector 1, the CQI 2 of the sector 2, the first precoding matrix corresponding to the sector 1, and the second precoding matrix corresponding to the sector 2 in the first period, the third period, . . . , and the $(1+2n)^{th}$ (n is an integer) period according to the period feedback rule, and feeds back, to the network device, the CQI 3 of the joint sector and the corresponding third precoding matrix in the second period, the fourth period, . . . , and the $(2+2n)^{th}$ (n is an integer) period. Duration of each period is T1. It should be noted that the precoding rule and the period feedback rule are predefined by the user equipment and the network device. Such a feedback manner is a feedback manner combining an implicit manner and an explicit manner, and a schematic diagram of the feedback manner combining an implicit manner and an explicit manner is shown in FIG. 8.

706. When the single-sector joint feedback period arrives, the network device receives the CQI that is of each single sector and that is fed back by the user equipment, and the precoding matrix indicating a single sector corresponding to the CQI of each single sector; or when the joint-sector joint feedback period arrives, receives the CQI that is of each joint sector and that is fed back by the user equipment, and the precoding matrix indicating a joint sector corresponding to the CQI of each joint sector, where each CQI is used by the network device to determine a target sector providing a communications service for the user equipment. In this embodiment, the network device learns, according to the period feedback rule, that the CQI 1 of the sector 1, the first precoding matrix corresponding to the sector 1, the CQI 2 of the sector 2, and the second precoding matrix corresponding to the sector 2 that are fed back by the user equipment are received in the first period, the third period, . . . , and the $(1+2n)^{th}$ (n is an integer) period, and learns that the CQI 3 of the joint sector and the third precoding matrix corresponding to the joint sector are received in the second period, the fourth period, . . . , and the $(2+2n)^{th}$ (n is an integer) period. Duration of each period is T1. Then, the network device learns, according to the precoding rule, that the CQI 1 corresponding to the first precoding matrix is a channel quality indicator of the sector 1, the CQI 2 corresponding to the second precoding matrix is a channel quality indicator of the sector 2, and the CQI 3 corresponding to the third precoding matrix is a channel quality indicator of the joint sector. The network device determines, according to the received CQI 1, CQI 2, and CQI 3, that the sector 1, the sector 2, or the joint sector provides the communications service for the user equipment. For example, the network device determines, according to max (CQI 1, CQI 2, CQI 3), a service mode provided for the UE, and if max (CQI 1, CQI 2, CQI 3)=CQI 3, the network device determines, according to the period feedback rule, that the channel quality indicator of the joint sector is received in the second period, the fourth period, . . . , and the $(2+2n)^{th}$ (n is an integer) period, and learns, according to the third precoding matrix, that a sector corresponding to the CQI 3 is the joint sector, so that the network device allocates the joint sector to provide the communications service for the UE.

In this embodiment of the present disclosure, when the user equipment periodically sends each obtained CQI, load of the user equipment is reduced. In addition, each CQI fed back by the user equipment is corresponding to one precoding matrix, so that information transmission reliability is ensured. The network device can learn, according to the precoding rule and the period feedback rule, sector information corresponding to each CQI.

The channel quality indicator (CQI) feedback method in the embodiment of the present disclosure is described above, and user equipment in an embodiment of the present disclosure is described below. The user equipment is applied to a co-cell communications system, a cell in the co-cell communications system includes at least two single sectors and at least one joint sector, each of the at least two single sectors is used to provide a single-sector communications service for user equipment in the cell, and each of the at least one joint sector is used to provide a joint-sector communications service for the user equipment.

Figure 9:
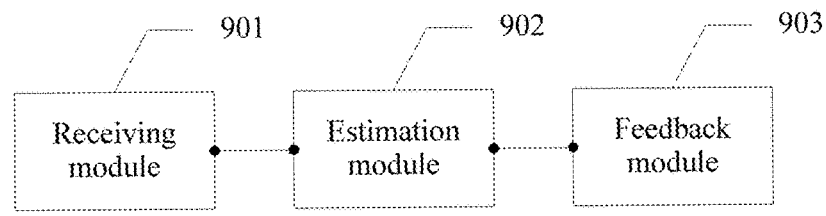
FIG. 9 is a schematic diagram of an embodiment of user equipment according to an embodiment of the present disclosure.

Referring to FIG. 9, an embodiment of user equipment in an embodiment of the present disclosure includes a receiving module 901, an estimation module 902, and a feedback module 903.

The receiving module 901 is configured to receive a secondary pilot receive signal that is of each single sector and that is obtained after a secondary pilot transmit signal of each single sector transmitted by a network device is transmitted by using a radio channel.

The estimation module 902 is configured to: estimate a CQI of each single sector according to the secondary pilot receive signal that is of each single sector and that is received by the receiving module 901, the pre-known secondary pilot transmit signal of each single sector, and a first precoding matrix, and estimate a CQI of each joint sector according to the secondary pilot receive signal that is of each single sector and that is received by the receiving module

901, the pre-known secondary pilot transmit signal of each single sector, and a second precoding matrix.

The feedback module 903 is configured to feedback, to the network device, each CQI estimated by the estimation module 902.

Optionally, in some embodiments of the present disclosure, the feedback module 903 is further configured to feedback, to the network device, a precoding matrix indicating a sector corresponding to each CQI.

Optionally, in some embodiments of the present disclosure, the feedback module 903 is configured to: when a feedback period corresponding to each single sector arrives, feedback, to the network device, the CQI corresponding to each single sector; or when a feedback period corresponding to each joint sector arrives, feedback, to the network device, the CQI corresponding to each joint sector.

Optionally, in some embodiments of the present disclosure, the feedback module 903 is configured to: when a single-sector joint feedback period arrives, feedback, to the network device, the CQI that is of each single sector and that is coded according to a predefined joint coding rule; or when a joint-sector joint feedback period arrives, feedback, to the network device, the CQI that is of each joint sector and that is coded according to the predefined joint coding rule.

Optionally, in some embodiments of the present disclosure, the feedback module 903 is configured to: when a single-sector joint feedback period arrives, feedback, to the network device, the CQI of each single sector and a precoding matrix indicating a single sector corresponding to the CQI of each single sector; or when a joint-sector joint feedback period arrives, feedback, to the network device, the CQI of each joint sector and a precoding matrix indicating a joint sector corresponding to the CQI of each joint sector.

In this embodiment of the present disclosure, the user equipment can obtain CQIs of multiple single sectors by performing estimation once, and can obtain CQIs of multiple joint sectors by performing estimation once, so that complexity of the user equipment is reduced, and hardware resources of the user equipment are saved. In addition, the user equipment may feedback each obtained CQI to the network device by using different rules.

Figure 10:
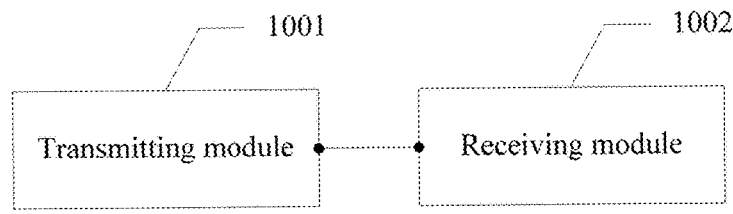
FIG. 10 is a schematic diagram of an embodiment of a network device according to an embodiment of the present disclosure.

A network device in an embodiment of the present disclosure is described below. The network device is applied to a co-cell communications system, a cell in the co-cell communications system includes at least two single sectors and at least one joint sector, each of the at least two single sectors is used to provide a single-sector communications service for user equipment in the cell, and each of the at least one joint sector is used to provide a joint-sector communications service for the user equipment. Referring to FIG. 10, an embodiment of the network device in this embodiment of the present disclosure includes a transmitting module 1001 and a receiving module 1002.

The transmitting module 1001 is configured to transmit a secondary pilot transmit signal of each single sector to the user equipment.

The receiving module 1002 is configured to receive each CQI fed back by the user equipment, where each CQI is used by the network device to determine a target sector providing a communications service for the user equipment.

Optionally, in some embodiments of the present disclosure, the receiving module 1002 is further configured to receive a precoding matrix that is fed back by the user equipment and that indicates a sector corresponding to each CQI.

Optionally, in some embodiments of the present disclosure, the receiving module 1002 is configured to: when a feedback period corresponding to each single sector arrives, receive a CQI that is corresponding to each single sector and that is fed back by the user equipment; or when a feedback period corresponding to each joint sector arrives, receive a CQI that is corresponding to each joint sector and that is fed back by the user equipment.

Optionally, in some embodiments of the present disclosure, the receiving module 1002 is configured to: when a single-sector joint feedback period arrives, receive a CQI that is of each single sector, coded according to a predefined joint coding rule, and fed back by the user equipment; or when a joint-sector joint feedback period arrives, receive a CQI that is of each joint sector, coded according to the predefined joint coding rule, and fed back by the user equipment.

Optionally, in some embodiments of the present disclosure, the receiving module 1002 is configured to: when a single-sector joint feedback period arrives, receive a CQI that is of each single sector and that is fed back by the user equipment, and a precoding matrix indicating a single sector corresponding to the CQI of each single sector; or when a joint-sector joint feedback period arrives, receive a CQI that is of each joint sector and that is fed back by the user equipment, and a precoding matrix indicating a joint sector corresponding to the CQI of each joint sector.

In this embodiment of the present disclosure, the network device receives, by using different rules, each CQI fed back by the user equipment, and determines, according to each obtained CQI, the target sector providing the communications service for the user equipment. The user equipment and the network device in the embodiments of the present disclosure are described above from a perspective of a modular function entity. The user equipment and the network device in the embodiments of the present disclosure are described below from a perspective of hardware processing.

Figure 11:
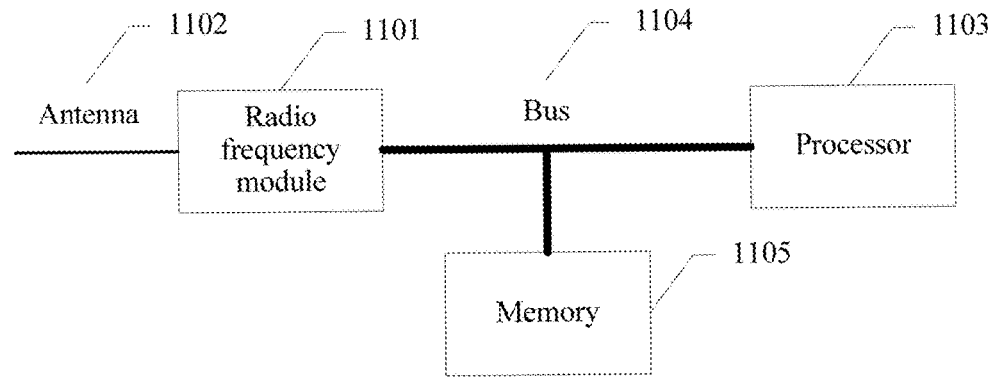
FIG. 11 is a schematic diagram of another embodiment of user equipment according to an embodiment of the present disclosure.

Referring to FIG. 11, another embodiment of user equipment in an embodiment of the present disclosure includes a radio frequency module 1101, an antenna 1102, a processor 1103, a bus 1104, and a memory 1105. The radio frequency module 1101 is connected to the antenna 1102, and the radio frequency module 1101, the processor 1103, and the memory 1105 are connected by using the bus 1104. The radio frequency module 1101 receives a secondary pilot receive signal of each single sector by using the antenna 1102.

The radio frequency module 1101 executes the following function:

receiving a secondary pilot receive signal that is of each single sector and that is obtained after a secondary pilot transmit signal of each single sector transmitted by a network device is transmitted by using a radio channel.

The processor 1103 executes the following functions:

estimating a CQI of each single sector according to the secondary pilot receive signal of each single sector, the pre-known secondary pilot transmit signal of each single sector, and a first precoding matrix, and estimating a CQI of each joint sector according to the secondary pilot receive signal of each single sector, the pre-known secondary pilot transmit signal of each single sector, and a second precoding matrix; and feeding back each CQI to the network device.

In some embodiments of the present disclosure, the processor 1103 is further configured to execute the following function:

feeding back, to the network device, a precoding matrix indicating a sector corresponding to each CQI.

In some embodiments of the present disclosure, the processor 1103 is configured to execute the following functions:

when a feedback period corresponding to each single sector arrives, feeding back, to the network device, the CQI corresponding to each single sector; or when a feedback period corresponding to each joint sector arrives, feeding back, to the network device, the CQI corresponding to each joint sector.

In some embodiments of the present disclosure, the processor 1103 is configured to execute the following functions:

when a single-sector joint feedback period arrives, feeding back, to the network device, the CQI that is of each single sector and that is coded according to a predefined joint coding rule; or when a joint-sector joint feedback period arrives, feeding back, to the network device, the CQI that is of each joint sector and that is coded according to the predefined joint coding rule.

In some embodiments of the present disclosure, the processor 1103 is configured to execute the following functions:

when a single-sector joint feedback period arrives, feeding back, to the network device, the CQI of each single sector and a precoding matrix indicating a single sector corresponding to the CQI of each single sector; or when a joint-sector joint feedback period arrives, feeding back, to the network device, the CQI of each joint sector and a precoding matrix indicating a joint sector corresponding to the CQI of each joint sector.

In this embodiment of the present disclosure, the user equipment can obtain CQIs of multiple single sectors by performing estimation once, and can obtain CQIs of multiple joint sectors by performing estimation once, so that complexity of the user equipment is reduced, and hardware resources of the user equipment are saved. In addition, the user equipment may feedback each obtained CQI to the network device by using different rules.

Figure 12:
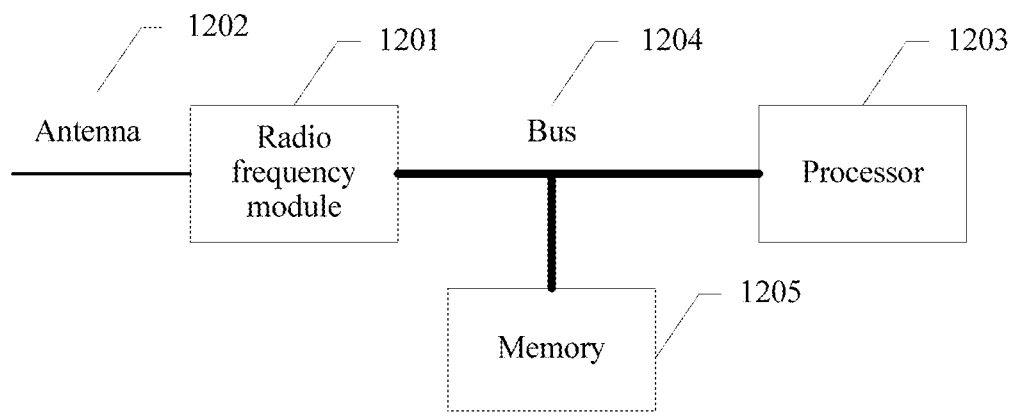
FIG. 12 is a schematic diagram of another embodiment of a network device according to an embodiment of the present disclosure.

Referring to FIG. 12, another embodiment of a network device in an embodiment of the present disclosure includes a radio frequency module 1201, an antenna 1202, a processor 1203, a bus 1204, and a memory 1205. The radio frequency module 1201 is connected to the antenna 1202, and the radio frequency module 1201, the processor 1203, and the memory 1205 are connected by using the bus 1202. The radio frequency module 1201 transmits a secondary pilot transmit signal of each single sector by using the antenna 1202.

The radio frequency module 1201 executes the following function:

transmitting a secondary pilot transmit signal of each single sector to user equipment.

The processor 1203 executes the following function:

receiving each CQI fed back by the user equipment, where each CQI is used by the network device to determine a target sector providing a communications service for the user equipment.

In some embodiments of the present disclosure, the processor 1203 is further configured to execute the following function:

receiving a precoding matrix that is fed back by the user equipment and that indicates a sector corresponding to each CQI.

In some embodiments of the present disclosure, the processor 1203 is configured to execute the following functions:

when a feedback period corresponding to each single sector arrives, receiving a CQI that is corresponding to each single sector and that is fed back by the user equipment; or when a feedback period corresponding to each joint sector arrives, receiving a CQI that is corresponding to each joint sector and that is fed back by the user equipment. In some embodiments of the present disclosure, the processor 1203 is configured to execute the following functions:

when a single-sector joint feedback period arrives, receiving a CQI that is of each single sector, coded according to a predefined joint coding rule, and fed back by the user equipment; or when a joint-sector joint feedback period arrives, receiving a CQI that is of each joint sector, coded according to the predefined joint coding rule, and fed back by the user equipment.

In some embodiments of the present disclosure, the processor 1203 is configured to execute the following functions:

when a single-sector joint feedback period arrives, receiving a CQI that is of each single sector and that is fed back by the user equipment, and a precoding matrix indicating a single sector corresponding to the CQI of each single sector; or when a joint-sector joint feedback period arrives, receiving a CQI that is of each joint sector and that is fed back by the user equipment, and a precoding matrix indicating a joint sector corresponding to the CQI of each joint sector.

In this embodiment of the present disclosure, the network device receives, by using different rules, each CQI fed back by the user equipment, and determines, according to each obtained CQI, the target sector providing the communications service for the user equipment.

Figure 13:
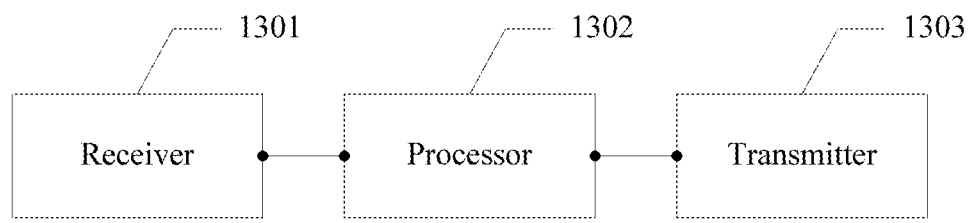
FIG. 13 is a schematic diagram of another embodiment of user equipment according to an embodiment of the present disclosure.

Referring to FIG. 13, an embodiment of user equipment in an embodiment of the present disclosure includes a receiver 1301, a processor 1302, and a transmitter 1303.

The receiver 1301 is configured to receive a secondary pilot receive signal that is of each single sector and that is obtained after a secondary pilot transmit signal of each single sector transmitted by a network device is transmitted by using a radio channel.

The processor 1302 is configured to: estimate a CQI of each single sector according to the secondary pilot receive signal that is of each single sector and that is received by the receiver 1301, the pre-known secondary pilot transmit signal of each single sector, and a first precoding matrix, and estimate a CQI of each joint sector according to the secondary pilot receive signal that is of each single sector and that is received by the receiver 1301, the pre-known secondary pilot transmit signal of each single sector, and a second precoding matrix.

The transmitter 1303 is configured to feedback each CQI to the network device.

Optionally, in some embodiments of the present disclosure, the transmitter 1303 is further configured to feedback, to the network device, a precoding matrix indicating a sector corresponding to each CQI.

Optionally, in some embodiments of the present disclosure, the transmitter 1303 is configured to: when a feedback period corresponding to each single sector arrives, feedback, to the network device, the CQI corresponding to each single sector; or when a feedback period corresponding to each joint sector arrives, feedback, to the network device, the CQI corresponding to each joint sector.

Optionally, in some embodiments of the present disclosure, the transmitter 1303 is configured to: when a single-sector joint feedback period arrives, feedback, to the network device, the CQI that is of each single sector and that is coded according to a predefined joint coding rule; or when a joint-sector joint feedback period arrives, feedback, to the network device, the CQI that is of each joint sector and that is coded according to the predefined joint coding rule.

Optionally, in some embodiments of the present disclosure, the transmitter 1303 is configured to: when a single-sector joint feedback period arrives, feedback, to the network device, the CQI of each single sector and a precoding matrix indicating a single sector corresponding to the CQI of each single sector; or when a joint-sector joint feedback period arrives, feedback, to the network device, the CQI of each joint sector and a precoding matrix indicating a joint sector corresponding to the CQI of each joint sector.

Figure 14:
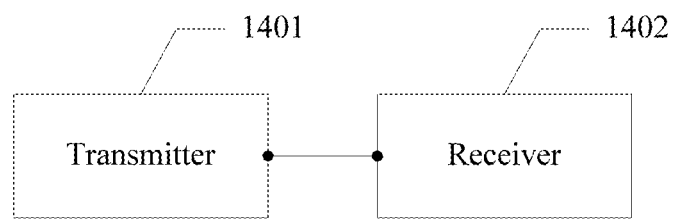
FIG. 14 is a schematic diagram of another embodiment of a network device according to an embodiment of the present disclosure.

In this embodiment of the present disclosure, the user equipment can obtain CQIs of multiple single sectors by performing estimation once, and can obtain CQIs of multiple joint sectors by performing estimation once, so that complexity of the user equipment is reduced, and hardware resources of the user equipment are saved. In addition, the user equipment may feedback each obtained CQI to the network device by using different rules. A network device in an embodiment of the present disclosure is described below. The network device is applied to a co-cell communications system, a cell in the co-cell communications system includes at least two single sectors and at least one joint sector, each of the at least two single sectors is used to provide a single-sector communications service for user equipment in the cell, and each of the at least one joint sector is used to provide a joint-sector communications service for the user equipment. Referring to FIG. 14, an embodiment of the network device in this embodiment of the present disclosure includes a transmitter 1401 and a receiver 1402.

The transmitter 1401 is configured to transmit a secondary pilot transmit signal of each single sector to the user equipment.

The receiver 1402 is configured to receive each CQI fed back by the user equipment, where each CQI is used by the network device to determine a target sector providing a communications service for the user equipment.

Optionally, in some embodiments of the present disclosure, the receiver 1402 is further configured to receive a precoding matrix that is fed back by the user equipment and that indicates a sector corresponding to each CQI.

Optionally, in some embodiments of the present disclosure, the receiver 1402 is configured to: when a feedback period corresponding to each single sector arrives, receive a CQI that is corresponding to each single sector and that is fed back by the user equipment; or when a feedback period corresponding to each joint sector arrives, receive a CQI that is corresponding to each joint sector and that is fed back by the user equipment. Optionally, in some embodiments of the present disclosure, the receiver 1402 is configured to: when a single-sector joint feedback period arrives, receive a CQI that is of each single sector, coded according to a predefined joint coding rule, and fed back by the user equipment; or when a joint-sector joint feedback period arrives, receive a CQI that is of each joint sector, coded according to the predefined joint coding rule, and fed back by the user equipment.

Optionally, in some embodiments of the present disclosure, the receiver 1402 is configured to: when a single-sector joint feedback period arrives, receive a CQI that is of each single sector and that is fed back by the user equipment, and a precoding matrix indicating a single sector corresponding to the CQI of each single sector; or when a joint-sector joint feedback period arrives, receive a CQI that is of each joint sector and that is fed back by the user equipment, and a precoding matrix indicating a joint sector corresponding to the CQI of each joint sector.

In this embodiment of the present disclosure, the network device receives, by using different rules, each CQI fed back by the user equipment, and determines, according to each obtained CQI, the target sector providing the communications service for the user equipment.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A channel quality indicator (CQI) feedback method, wherein the method is applied to a co-cell communications system, a cell in the co-cell communications system comprises at least two single sectors and at least one joint sector, each of the at least two single sectors for providing a single-sector communications service for user equipment in the cell, and each of the at least one joint sector for providing a joint-sector communications service for the user equipment, the method comprising:

receiving, by the user equipment, a secondary pilot receive signal of each single sector and that is obtained after a secondary pilot transmit signal of each single sector transmitted by a network device is transmitted by using a radio channel;

estimating, by the user equipment, a CQI of each single sector according to the secondary pilot receive signal of each single sector, a pre-known secondary pilot transmit signal of each single sector, and a first precoding matrix;

estimating, by the user equipment, a CQI of each joint sector according to the secondary pilot receive signal of each single sector, a pre-known secondary pilot transmit signal of each single sector, and a second precoding matrix; and feeding back, by the user equipment, each CQI to the network device.

2. The method according to claim 1, wherein when the user equipment feeds back each CQI to the network device, the method further comprises:

feeding back, by the user equipment to the network device, a precoding matrix indicating a sector corresponding to each CQI.

3. The method according to claim 1, wherein feeding back, by the user equipment, each CQI to the network device comprises:

when a feedback period corresponding to each single sector arrives, feeding back, by the user equipment to the network device, the CQI corresponding to each single sector; or when a feedback period corresponding to each joint sector arrives, feeding back, by the user equipment to the network device, the CQI corresponding to each joint sector.

4. The method according to claim 1, wherein feeding back, by the user equipment, each CQI to the network device comprises:

when a single-sector joint feedback period arrives, feeding back, by the user equipment to the network device, the CQI of each single sector that is coded according to a predefined joint coding rule; or when a joint-sector joint feedback period arrives, feeding back, by the user equipment to the network device, the CQI that is of each joint sector and that is coded according to the predefined joint coding rule.

5. The method according to claim 1, wherein feeding back, by the user equipment, each CQI to the network device comprises:

when a single-sector joint feedback period arrives, feeding back, by the user equipment to the network device, the CQI of each single sector and a precoding matrix indicating a single sector corresponding to the CQI of each single sector; or when a joint-sector joint feedback period arrives, feeding back, by the user equipment to the network device, the CQI of each joint sector and a precoding matrix indicating a joint sector corresponding to the CQI of each joint sector.

6. User equipment for use in a co-cell communications system, a cell in the co-cell communications system comprises at least two single sectors and at least one joint sector, each of the at least two single sectors for providing a single-sector communications service for user equipment in the cell, and each of the at least one joint sector for providing a joint-sector communications service for the user equipment, the user equipment comprising:

a receiver, configured to receive a secondary pilot receive signal of each single sector and that is obtained after a secondary pilot transmit signal of each single sector transmitted by a network device is transmitted by using a radio channel;

a processor, configured to:
estimate a channel quality indicator (CQI) of each single sector according to the secondary pilot receive signal of each single sector, a pre-known secondary pilot transmit signal of each single sector, and a first precoding matrix, and estimate a CQI of each joint sector according to the secondary pilot receive signal of each single sector, a pre-known secondary pilot transmit signal of each single sector, and a second precoding matrix; and a transmitter, configured to feedback, to the network device, each CQI estimated by the processor.

7. The user equipment according to claim 6, wherein the transmitter is further configured to feedback, to the network device, a precoding matrix indicating a sector corresponding to each CQI.

8. The user equipment according to claim 6, wherein the transmitter is configured to:

when a feedback period corresponding to each single sector arrives, feedback, to the network device, the CQI corresponding to each single sector; or when a feedback period corresponding to each joint sector arrives, feedback, to the network device, the CQI corresponding to each joint sector.

9. The user equipment according to claim 6, wherein the transmitter is configured to:

when a single-sector joint feedback period arrives, feedback, to the network device, the CQI of each single sector that is coded according to a predefined joint coding rule; or when a joint-sector joint feedback period arrives, feedback, to the network device, the CQI of each joint sector that is coded according to the predefined joint coding rule.

10. The user equipment according to claim 6, wherein the transmitter is configured to:

when a single-sector joint feedback period arrives, feedback, to the network device, the CQI of each single sector and a precoding matrix indicating a single sector corresponding to the CQI of each single sector; or when a joint-sector joint feedback period arrives, feedback, to the network device, the CQI of each joint sector and a precoding matrix indicating a joint sector corresponding to the CQI of each joint sector.

11. A network device for use in a co-cell communications system, a cell in the co-cell communications system comprises at least two single sectors and at least one joint sector, each of the at least two single sectors for providing a single-sector communications service for user equipment in the cell, and each of the at least one joint sector for providing a joint-sector communications service for the user equipment, the network device comprising:

a transmitter, configured to transmit a secondary pilot transmit signal of each single sector to the user equipment; and a receiver, configured to receive each channel quality indicator (CQI) fed back by the user equipment, wherein each received CQI is used by the network device to determine a target sector providing a communications service for the user equipment.

12. The network device according to claim 11, wherein the receiver is further configured to receive a precoding matrix fed back by the user equipment that indicates a sector corresponding to each CQI.

13. The network device according to claim 11, wherein the receiver is configured to:
when a feedback period corresponding to each single sector arrives, receive a CQI corresponding to each single sector that is fed back by the user equipment; or
when a feedback period corresponding to each joint sector arrives, receive a CQI corresponding to each joint sector that is fed back by the user equipment.

14. The network device according to claim 11, wherein the receiver is configured to:
when a single-sector joint feedback period arrives, receive a CQI of each single sector that is coded according to a predefined joint coding rule and fed back by the user equipment; or
when a joint-sector joint feedback period arrives, receive a CQI of each joint sector that is coded according to the predefined joint coding rule and fed back by the user equipment.

15. The network device according to claim 11, wherein the receiver is configured to:
when a single-sector joint feedback period arrives, receive a CQI of each single sector that is fed back by the user equipment and a precoding matrix indicating a single sector corresponding to the CQI of each single sector; or
when a joint-sector joint feedback period arrives, receive a CQI of each joint sector that is fed back by the user equipment and a precoding matrix indicating a joint sector corresponding to the CQI of each joint sector.

* * * * *